US010804566B2

United States Patent
Xia et al.

(10) Patent No.: US 10,804,566 B2
(45) Date of Patent: Oct. 13, 2020

(54) LITHIUM BATTERY CONTAINING CATHODE MATERIAL AND ELECTROLYTE ADDITIVES FOR HIGH VOLTAGE APPLICATION

(71) Applicants: Umicore, Brussels (BE); Umicore Korea Ltd., Chungnam (KR)

(72) Inventors: Xin Xia, Cheonan (KR); Maxime Blangero, Cheonan (KR); Jing Zhang, Cheonan (KR); Wenlong Yang, Cheonan (KR); Jens Paulsen, Daejeon (KR)

(73) Assignees: Umicore, Brussels (BE); Umicore Korea Ltd., Chungnam (KR)

( * ) Notice: Subject to any disclaimer, the term of this patent is extended or adjusted under 35 U.S.C. 154(b) by 146 days.

(21) Appl. No.: 15/759,974

(22) PCT Filed: Sep. 15, 2016

(86) PCT No.: PCT/IB2016/055485
§ 371 (c)(1),
(2) Date: Mar. 14, 2018

(87) PCT Pub. No.: WO2017/046723
PCT Pub. Date: Mar. 23, 2017

(65) Prior Publication Data
US 2018/0254525 A1 Sep. 6, 2018

Related U.S. Application Data

(60) Provisional application No. 62/219,177, filed on Sep. 16, 2015.

(30) Foreign Application Priority Data

Sep. 17, 2015 (EP) .................................... 15185611
Oct. 16, 2015 (EP) .................................... 15190115

(51) Int. Cl.
*H01M 10/0569* (2010.01)
*H01M 4/525* (2010.01)
(Continued)

(52) U.S. Cl.
CPC ........ *H01M 10/0569* (2013.01); *C01G 51/42* (2013.01); *H01M 4/366* (2013.01);
(Continued)

(58) Field of Classification Search
None
See application file for complete search history.

(56) References Cited

U.S. PATENT DOCUMENTS

2004/0013946 A1    1/2004   Abe
2009/0309063 A1*  12/2009   Paulsen .............. C01G 45/1228
                                                           252/182.33
(Continued)

FOREIGN PATENT DOCUMENTS

CN    101616870 A    12/2009
CN    102394295 A     3/2012
(Continued)

OTHER PUBLICATIONS

International Search Report for PCT/IB2016/055485, dated Jan. 18, 2017.
(Continued)

*Primary Examiner* — Maria Laios
(74) *Attorney, Agent, or Firm* — NK Patent Law

(57) ABSTRACT

A lithium secondary cell having an operating voltage ≥4.35 sV, comprising a cathode comprising a doped LiCoO₂ active material, an anode comprising graphite, and an electrolyte comprising a carbonate-based solvent, a lithium salt and both a succinonitrile (SN) and a lithium bis(oxalato)borate (LiBOB) additive wherein during the discharge at 45° C. from a state of charge (SOC) of 100% at 4.5V to a SOC of
(Continued)

0 at 3V at a C/10 rate the difference of the SOC at 4.42V and 4.35V is at least 7% but less than 14%, and wherein the active material is doped by at least 0.5 mole % of either one or more of Mn, Mg and Ti.

14 Claims, 11 Drawing Sheets

(51) Int. Cl.

| | |
|---|---|
| *H01M 10/0525* | (2010.01) |
| *H01M 10/0567* | (2010.01) |
| *H01M 4/36* | (2006.01) |
| *H01M 4/587* | (2010.01) |
| *H01M 10/0568* | (2010.01) |
| *H01M 4/505* | (2010.01) |
| *H01M 4/02* | (2006.01) |
| *C01G 51/00* | (2006.01) |

(52) U.S. Cl.
CPC .......... *H01M 4/525* (2013.01); *H01M 4/587* (2013.01); *H01M 10/0525* (2013.01); *H01M 10/0567* (2013.01); *H01M 10/0568* (2013.01); *H01M 4/505* (2013.01); *H01M 2004/028* (2013.01); *H01M 2220/30* (2013.01); *H01M 2300/0037* (2013.01)

(56) References Cited

U.S. PATENT DOCUMENTS

| | | | |
|---|---|---|---|
| 2010/0216035 A1 | 8/2010 | Iwanaga et al. | |
| 2012/0134914 A1 | 5/2012 | Paulsen | |
| 2012/0202121 A1 | 8/2012 | Richard | |
| 2012/0313570 A1 | 12/2012 | Ohtaniuchi et al. | |
| 2013/0323607 A1* | 12/2013 | Issaev ................. | H01M 2/1653 429/338 |
| 2014/0212759 A1 | 7/2014 | Blangero et al. | |

FOREIGN PATENT DOCUMENTS

| | | |
|---|---|---|
| CN | 103635431 A | 3/2014 |
| CN | 103733412 A | 4/2014 |
| CN | 104319417 A | 1/2015 |
| JP | 2006331943 A | 12/2006 |
| JP | 2009123465 A | 6/2009 |
| JP | 2010198916 A | 9/2010 |
| JP | 2012256502 A | 12/2012 |
| JP | 2014516454 A | 7/2014 |
| JP | 2014241300 A | 12/2014 |
| KR | 10-2001-0002784 | 1/2001 |
| KR | 10-2003-0083476 | 10/2003 |
| KR | 20140025343 A | 3/2014 |
| WO | 2008-138132 | 11/2008 |
| WO | 2008138110 A1 | 11/2008 |
| WO | 2012171780 | 12/2012 |

OTHER PUBLICATIONS

Taubert, C., et al.,. "LiBOB as Conductive Salt or Additive for Li-Ion Batteries", 214th ECS Meeting, Honolulu, Hawaii, Oct. 12-17, 2008, Abstract #740, The Electrochemical Society.

Zhan, C., et al., "Mn(II) Deposition on Anodes and its Effects on Capacity Fade in Spinal Lithium Manganate-Carbon Systems", Nature Communications, (2013), vol. 4, pp. 2437.

Zhang, Z., et al., "Flourinated Electrolytes for 5 V Lithium-Ion Battery Chemistry", Energy Environ. Sci, vol. 6 (2013), pp. 1806-1810.

EPO, Search Report for European Patent Application No. 15185611, dated Feb. 18, 2016.

TIPO, Search Report for Taiwanese Patent Application No. 105130214, dated Mar. 27, 2017.

Gu-Yeon Kim et al., "ARC Studies of the Effects of Electrolyte Additives on the Reactivity of Delithiated Li1-x [Ni1/3Mn1/3Co1/3]O2 and Li1-x[Ni0.8Co0.15Al0.05]O2 Positive Electrode Materials with Electrolyte", Journal of Electrochemical Society, Jun. 20, 2014, pgs. A1394-A1398, vol. 161, No. 9.

A. Abouimrane et a., "Solid Electrolyte Based on Succinonitrile and LiBOB Interface Stability and Application in Lithium Batteries", Journal of Electrochemical Society, Sep. 20, 2007, pp. A1031-A1034, vol. 154, No. 11.

CNIPA; Office Action for Chinese Patent Application No. 201680051500.5 dated Jul. 3, 2020, 6 pages.

* cited by examiner

LITHIUM BATTERY CONTAINING CATHODE MATERIAL AND ELECTROLYTE ADDITIVES FOR HIGH VOLTAGE APPLICATION

This application is a National Stage application of International Application No. PCT/IB2016/055485, filed Sep. 15, 2016 and claims the benefit of U.S. Provisional Application No. 62/219,177, filed Sep. 16, 2015. This application also claims priority to European Application No. EP15185611.9, filed Sep. 17, 2015 and European Application No. EP15190115.4, filed Oct. 16, 2015.

TECHNICAL FIELD AND BACKGROUND

This invention relates to secondary lithium ion batteries, containing positive electrode material and electrolyte additives, which are useful for a high voltage application. More particularly, the positive electrode comprises a lithium cobalt oxide compound.

In recent decades, rechargeable lithium-ion batteries have been widely used in a variety of portable electronics applications, such as cellular phones, laptop computers, digital cameras and video cameras. Commercial lithium ion batteries employ lithium cobalt oxide as cathode material and graphite as anode material. With the development of customer electronics, there is a surge towards lithium cobalt oxide based secondary lithium ion batteries with higher energy density. In last years, initial efforts have been made for the optimization of cell design, including packing technology, powder engineering and anode system, which successfully improved volumetric energy density. However, the improvement is limited by the cathode system. A continuous optimization of the cathode material is necessary to achieve higher energy densities. Here, the energy density of cathode materials can be defined as the product of the packing density (g/cm$^3$), specific capacity (mAh/g) and average operating voltage (V).

There are two common ways to improve the energy density: (a) to increase the packing density, for example by increasing the particle size of the powder particles, and (b) to increase the specific capacity by increasing the charge voltage, typically to 4.5V or even 4.6V vs. Li metal when fitted in coin cells, and 4.35V, 4.4V or even more vs. graphite when fitted in full cells, which requires more robust cathode materials that can be charged at higher voltage. State-of-the-art LiCoO$_2$-based cathode materials generally have a high gravimetric density, but are not cycling in a stable manner at high voltage. Full cells with LiCoO$_2$ cathode are usually cycled with an upper cutoff voltage of about 4.2V with respect to a graphite anode and yield a specific capacity of around 143 mAh/g. By increasing the charge voltage to 4.35V, the specific capacity can be improved to 164 mAh/g.

A further increase to 4.40V can push up the specific capacity by 20% when compared with the value at 4.2V. However, charge-discharge cycling of LiCoO$_2$ under such high upper cutoff voltage ($\geq$4.35V) results in fast capacity fading, which is considered to be due to the structural instability of de-intercalated LiCoO$_2$, and to side reactions between the unstable surface of LiCoO$_2$ and the electrolyte. As lithium is removed from Li$_x$CoO$_2$ (with x<1), oxidation of Co$^{3+}$ to an unstable oxidation state Co$^{4+}$ follows. The higher the charge voltage, the higher the amount of Co$^{4+}$. The charged lithium cobalt oxide is a very strong oxidizer and is highly reactive. Thus, the oxidizing surface dramatically increases unwanted side reactions with the electrolyte being a reducing agent. Even at low temperature during normal cycling at high voltage, these parasite reactions slowly but continuously proceed. This causes Co ions to dissolve in the electrolyte, and the cobalt may finally be deposited on the surface of the anode, and the electrolyte is decomposed. All these effects cause a continuous deterioration of the electrochemical performance of the battery: a loss of capacity and a strong increase of internal resistance (also known as polarization) is observed. Therefore, modifications such as doping and coating of the LiCoO$_2$ compound are necessary to protect the cathode from parasite reactions and to be applicable to high voltage applications.

This improved LiCoO$_2$ is more stable, but it still reacts with electrolyte when charged to high voltage, and this side reaction will be definitely accelerated if cells are stored at high temperature after charging. Thus, inherently, LiCoO$_2$ has a severe storage issue, which gets worse when the cut-off voltage is increased. Current solutions to improve the storage and performance are developing more robust LiCoO$_2$-based cathode material and more stable electrolyte system, e.g. by adding suitable electrolyte additives to prevent or reduce parasite reactions. In "Energy Environmental Science, 2011, 4, 4038", Young-Soo Kim et al. proposed the electrolyte additive succinonitrile, C$_2$H$_4$(CN)$_2$, referred to as SN, which improves the stability at elevated temperature of lithium ion batteries that consist of LiCoO$_2$-based cathodes and graphite-based anodes. They found that the introduction of SN reduces bulging of the cells and considered that this improvement was due to the strong complex coordination between the surface of LiCoO$_2$ and SN. In US20040013946 A1, SN is also suggested as an electrolyte additive to improve cycling performance and storage properties. Thus, SN is a good candidate additive to sustain electrolyte stability during storage.

However, this electrolyte additive causes undesired side-effects. In "Journal of The Electrochemical Society, 2014, 161 (4) A506", the AC impedance of LiCoO$_2$/graphite pouch cells with and without addition of SN is measured after 20 cycles of charge/discharge with 0.1 C at 40° C. The authors found that a cell with SN has a much larger impedance compared to cells without SN, and thus SN facilitates the growth of impedance during cycling. These cycling conditions are storage-like conditions, and they favor the impedance growth. It is possible that SN has a little effect on cycling performance at room temperature and does not cause problems when applied in batteries for daily use. However, considering that cells are used at varying temperatures, like it is the case when cells are charged and stored at high temperature and then cycled at normal temperature, the impedance build-up in the period of high temperature can bring an inevitable negative effect on cycling at normal temperature. Therefore, it is necessary to find a solution to mitigate the growth of impedance, when SN is used as an electrolyte additive to improve storage stability.

Lithium bis(oxalato)borate, LiB(C$_2$O$_4$)$_2$, referred to as LiBOB is also a known electrolyte additive, but Fuji et al., in https://www.electrochem.org/dl/ma/202/pdfs/0203.PDF, found that in a cell with LiCoO$_2$, LiBOB was judged to yield a poor electrochemical stability and discharge capacity, compared to common additives such as LiPF$_6$ and LiBF$_4$. Moreover, LiBOB was oxidized when charged over 4.5V. Taubert et al., in "214$^{th}$ ECS Meeting, Abstract #740", also confirm that the use of LiBOB as electrolyte salt seems to be less compatible with LiCoO$_2$ cathode materials.

To summarize, the object of the current invention is to provide a secondary lithium ion battery that can be charged to high voltage (above 4.35V in a full cell) and has a good stability and low impedance build-up during high temperature storage. To be specific, it targets the development of high voltage $LiCoO_2$-based cathode materials combined with stable electrolyte systems with less impedance growth in high temperature storage.

SUMMARY

Viewed from a first aspect, the invention can provide the following product embodiments:

Embodiment 1

A lithium secondary cell having an operating voltage ≥4.35V, comprising a cathode comprising a powderous doped $LiCoO_2$ active material comprising a core and a surface layer, an anode comprising graphite, and an electrolyte comprising a carbonate-based solvent, a lithium salt and both a succinonitrile (SN) and a lithium bis(oxalato) borate (LiBOB) additive, wherein the active material is doped by at least 0.5 mole % of either one or more of Mn, Mg and Ti, and wherein either
  when the active material is doped by Mg, the Mg:Co ratio in the surface layer versus the Mg:Co ratio in the core is >2, or
  when the active material is doped by Mn, the Mn:Co ratio in the surface layer versus the Mn:Co ratio in the core is >2, or
  when the active material is doped by Ti, the Ti:Co ratio in the surface layer versus the Ti:Co ratio in the core is >2.
It may be that the particles of the active material consist only of the core and the surface layer. The surface layer may have a thickness less than 1 μm or even less than 500 nm.

Embodiment 2

The lithium secondary cell wherein during the discharge at 45° C. from a state of charge (SOC) of 100% at 4.5V to a SOC of 0% at 3V at a C/10 rate the difference of the SOC at 4.42V and 4.35V is at least 7% but less than 14%.

Embodiment 3

The lithium secondary cell wherein the electrolyte comprises 0.5-3 wt % succinonitrile and 0.5-5 wt % lithium bis(oxalato)borate. In this embodiment, it may also be that the electrolyte comprises 1-2 wt % succinonitrile and 1-2 wt % lithium bis(oxalato)borate.

Embodiment 4

The lithium secondary cell wherein the carbonate-based solvent comprises either one or more of ethylene carbonate (EC), vinylene carbonate (VC), fluoroethylene carbonate (FEC) and diethyl carbonate (DEC), and the lithium salt consists of $LiPF_6$.

Embodiment 5

The lithium secondary cell wherein the core of the active material has a layered crystal structure and consists of the elements Li, a metal M and oxygen, wherein the metal M has the formula $M=Co_{1-a''}M'_{a''}$, with $0 \leq a'' \leq 0.05$, wherein M' is Al or M' is Al and either one or more of Mg, Ti, Ga and B; and the surface layer comprises Li, Co, and inorganic N-based oxides or lithiated oxides, wherein N is either one or more metals of the group consisting of Al, Mg, Ti, Ni, Mn, Fe, Cu, Ca, Ba, Y, Sn, Sb, Na, Zn, Zr and Si; and wherein in the active material the molar ratio Al:Co>0.004, and both the Mg and Al contents of the core are different from the Mg and Al contents of the surface layer. In this embodiment, the Al content in the core may be radially constant, and be less than the Al content in the surface layer.

Embodiment 6

The lithium secondary cell wherein the surface layer of the active material consists of a plurality of islands densely sintered to the core, the islands comprising Ni and at least 5 mole %, and preferably at least 10 mole % of Mn.

Embodiment 7

The lithium secondary cell of embodiment 6, wherein the Mn concentration in the islands is at least 4 mole %, or even at least 7 mole % higher than the Mn concentration in the core, and wherein the Ni concentration in the islands is at least 2 mole %, or even at least 6 mole % higher than the Ni concentration in the core.

Embodiment 8

The lithium secondary cell wherein the active material has the general composition $Li_xCo_{1-a-b}M^1_aM^2_bO_{2-d}$ with $0.97<x<1.01$, $0.005 \leq a<0.10$, $0.001 \leq b \leq 0.02$, and $-0.1 \leq d \leq 0.1$, wherein $M^1$ is either one or both of Ni and Mn, $M^2$ is either one or more metals from the group consisting of Al, Mg, Ca, Ti, and Zr, wherein the particles of the material comprise a core P2 and a shell P1, wherein P1 consists of a plurality of islands densely sintered to the core P2, wherein the weight ratio P1/P2 is <0.5 and P1+P2=1, wherein the molar content of $M^1$ in P2 is less than in P1, and the molar content of ($M^2$+Co) in P2 is more than in P1. Preferably, $0.98 \leq x<1.00$. Here, it may also be that:
  P1 comprises Co and $M^1$, P2 comprises Co and $M^2$, wherein the molar content of $M^2$ in P2 is more than in P1, or
  near to the interface between P1 and P2, the molar content of $M^2$ has a gradient-like profile decreasing from b in P2 to below b/2 in P1, or
  near to the interface between P1 and P2, the molar content of $M^1$ has a gradient-like profile decreasing from a in P1 to below a/5 in P2, or
  $M^2$ consists of either one or both of 0.5 to 1.5 mole % Mg and 0.5 to 1.5 mole % Al.

Embodiment 9

The lithium secondary cell wherein the active material has the general composition $Li_xCo_{1-a'-b'}M^3_{a'}M^4_{b'}O_{2-d'}$ with $0.97<x'<1.01$, $0.005 \leq a'<0.10$, $0.001 \leq b' \leq 0.02$, and $-0.1 \leq d' \leq 0.1$, wherein $M^3$ is either one or both of Ni and Mn, $M^4$ is either Al, or Al and either one or more metals from the group consisting of Mg, Ca, Ti, and Zr, wherein the particles of the material comprise a core P2 and a shell P1, wherein P1 comprises Co and $M^3$, wherein P2 comprises Co and Al, wherein P1 consists of a plurality of islands densely sintered to the core and the weight ratio P1/P2 is <0.5 and P1+P2=1, wherein the molar content of $M^3$ in P2 is less than in P1, and the molar content of Al in P2 is more than in P1. Preferably, $0.98 \leq x'<1.00$. Here, it may also be that:

the molar content of each of Co and Al in P2 is more than in P1, or near to the interface between P1 and P2, the molar content of Al has a gradient-like profile decreasing from b' in P2 to below b'/2 in P1, or near to the interface between P1 and P2, the molar content of $M^3$ has a gradient-like profile decreasing from a' in P1 to below a'/5 in P2, or $M^4$ consists of 0.5 to 1.5 mole % Mg and 0.5 to 1.5 mole % Al.

Embodiment 10

The lithium secondary cell of embodiment 5, wherein in the active material M' is Al or M' is Al and either one or both of Ga and B; and the surface layer consists of Li, Co, and inorganic N-based oxides or lithiated oxides, wherein N is Al, Ti and Mg, or N is Al, Ti, Mg and either one or more metals of the group consisting of Fe, Cu, Ca, Ba, Y, Sn, Sb, Na, Zn, Zr and Si. It may be that either one or more of the Mg:Co and Ti:Co molar ratios in the surface layer is more than 2 times or even more than 5 times the corresponding nominal Mg:Co or Ti:Co molar ratios, the nominal ratios being the ratios in the powder comprising core and surface layer.

Embodiment 11

The lithium secondary cell of embodiment 10, wherein the molar ratio Li:(Co+Al) is more than 0.98 and less than 1.01.

Embodiment 12

The lithium secondary cell of embodiment 10, wherein the active material has an electrical conductivity less than $10^{-5}$ S/cm, or even less than $10^{-6}$ S/cm, measured under a pressure of 63.7 MPa at 25° C.

Unless otherwise mentioned, each of the individual product embodiments described hereabove can be combined with one or more of the product embodiments described before it. In several embodiments, the active material may have a bimodal particle size distribution where a small particle size fraction has a D50≥5 μm and is between 3 to 20 vol %, and where a large particle size fraction has a D50≥15 μm.

DETAILED DESCRIPTION OF INVENTION

Figure 1:
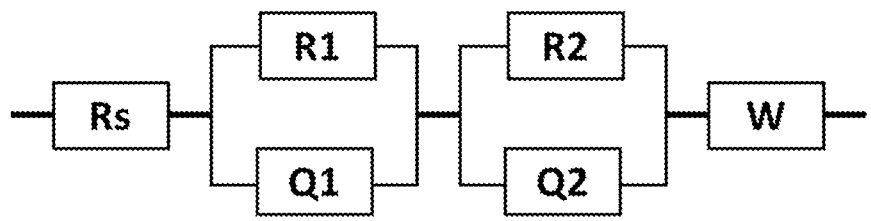
FIG. 1: Scheme of Equivalent electric circuit.

This invention provides rechargeable lithium ion batteries containing a $LiCoO_2$-based cathode material especially suitable for operation at high voltage and electrolyte additives which include SN and LiBOB. The active material of the cathode is doped by at least 0.5 mole % of either one or more of Mn, Mg and Ti. There are several methods to obtain this active material.

One method is similar to the methods described in WO2012/171780 and consists of the following steps:

(i) providing a first mixture of a first metal M-comprising and a first Li-comprising precursor powder, the first mixture having a Li to metal molar ratio >1.01 or even between 1.05 and 1.10, in particular between 1.07 and 1.09, (ii) sintering this mixture in an oxygen comprising atmosphere at a temperature $T_1$ of at least 600° C., thereby obtaining a Li-enriched lithium metal oxide compound;

(iii) providing a second M-comprising precursor powder, (iv) mixing the Li-enriched lithium metal oxide compound and the second M-comprising precursor powder into a second mixture, whereby the molar ratio of Li:M in the mixture is adjusted to 1.00±0.01, and (v) sintering the second mixture in an oxygen comprising atmosphere at a temperature $T_2$ of at least 600° C. This method results in a lithium metal oxide powder having a core and a surface layer, wherein the core has a layered structure consisting of the elements Li, a metal M and oxygen, M being a doped Co, and the surface layer comprising the elements of the core Li, M and oxygen, and inorganic N-based oxides, wherein N is Mg, Al and Ti. These N-oxides may also comprise Li.

The first M-comprising precursor and second M-comprising precursor can be a mixture of cobalt containing precursor and M' containing precursor. Examples of suitable cobalt containing precursors include cobalt oxide, hydroxide, oxyhydroxide, carbonate and oxalate. The M' containing precursor can be an oxide, hydroxide or organic complex, preferably having sub-micrometric powderous morphology in order to achieve homogeneous distribution and easy blending process. In several embodiments, either one or both of the first M-, the second M- and the first Li-comprising precursor powders further comprise at least one dopant from the group consisting of Al, Mg, Fe, Cu, Ti, Ca, Ba, Y, B, Sn, Sb, Na, Ga, Zn, F, P, S, and Zr. In one of these embodiments, either one or both of the first M- and the first Li-comprising precursor powders further comprise at least one element of the group consisting of Mg, Fe, Cu, Ti, Ca, Ba, Y, Sn, Sb, Na, Zn, Zr, F, P, S and Si. A homogeneous distribution of dopant elements is important and can be improved by using this process embodiment. In an alternative process embodiment, the homogeneous dispersion of dopants is improved when the second M-comprising precursor powder further comprises at least one element of the dopant element group consisting of Mg, Fe, Cu, Ti, Ca, Ba, Y, Sn, Sb, Na, Zn, Zr and Si. Examples of suitable compounds comprising the dopant elements are oxides (such as MgO, $TiO_2$, $SiO_2$, . . . ), fluorites (such as $MgF_2$ . . . ) with sub-micrometric particle size.

In one particular embodiment, Ti, Al and Mg, preferably in the form of $TiO_2$, $Al_2O_3$ and MgO particles with a D50 of respectively less than 100 nm, and less than 1 µm, are added to either one or both of the first and second mixtures described above. In another embodiment, Al, preferably in the form of $Al_2O_3$ particles with a D50 of less than 100 nm is added to the second mixture described above. In another particular embodiment the Li-enriched lithium metal oxide compound is $Li_{1+x}CoO_2$ with dense monolithic particles of at least 5 and preferably at least 10 to 20 micrometers. Many commercial prior art $LiCoO_2$ materials already have this desired morphology.

Another method is similar to the methods described in US2012/0134914 A1 and consists of the following steps:
(i) providing a first powder consisting of either a doped $LiCoO_2$ powder or a mixture of a cobalt containing precursor compound having a cobalt content of at least 90 mole % and dopant precursors;
(ii) providing a second powder consisting of either a Li—Ni—Mn—Co-oxide or a Ni—Mn—Co precursor powder and optionally a Li-precursor compound, preferably lithium carbonate,
(iii) mixing the first and the second powders,
(iv) sintering the mixture of the first and the second powders at a temperature T of at least 900° C., for a time t between 1 and 48 hrs, so as to obtain Mn and Ni bearing doped $LiCoO_2$ particles having Mn and Ni enriched islands on their surface. The quantity of the dopant precursors is selected to yield a final product comprising less than 5 mole % (versus the final Co+Mn+Ni content) of one or more dopants selected from the group consisting of Al and Mg, and less than 1 mole % (versus the final Co+Mn+Ni content) of one or more dopants selected from the group consisting of Ti, Be, B, Ca, Zr, S, F, and P. In one embodiment the composition and structure of the final products is a Mg doped $LiCoO_2$ core wherein some Ni and Mn have diffused, and a surface layer enriched with Ni and Mn, wherein some Co has diffused from the core. Different embodiments are possible besides the superficial island structure, such as a continuous surface layer.

In an embodiment of this method, the Ni—Mn—Co precursor powder is a transition metal hydroxide, oxyhydroxide, carbonate, oxycarbonate, or lithium transition metal compound, in which the transition metal composition M" is M"=$Ni_oMn_pCo_{1-o-p}$ with o+p>0.5 and o>p. Also, the Ni—Mn—Co precursor powder may comprise between 5 and 70 mole % of the transition metal content of the powderous lithium transition metal oxide. In another embodiment, if the second powder consists of Li—Ni—Mn—Co-oxide, the D50 of this powder is smaller than the D50 of the core doped $LiCoO_2$ particles.

The rechargeable batteries according to the invention allow to achieve a higher energy density because they can operate at high voltage, better utilizing the available lithium in the cathode. The batteries containing such stable cathode materials possess a high stability and low build-up resistances in the High Temperature (HT)-storage test described below, with the addition of a combination of suitable electrolyte additives according to the invention, like SN and LiBOB. Thus, the proposed rechargeable lithium ion batteries in this invention are promising to perform in a stable manner at high voltage conditions, and eventually satisfy the demand of high energy density.

This invention discovers that particular doped or surface modified $LiCoO_2$-based cathode materials can be charged in a stable manner to voltages above 4.35V in coin cell floating tests, and can be cycled at a high voltage of around 4.6V in a coin cell test. In one embodiment the $LiCoO_2$ powder is doped by 1 mole % Mg, 1 mole % Al and 0.283 mole % Ti. This doping brings positive effects on reducing the Co dissolution in a floating test, and surprisingly, optimizes the length of O3 to H1-3 transition plateau in the voltage profile that is obtained by cycling in the range of 3.0V to 4.6V.

The concept of O3-H1-3 transition was early explicated in the "Journal of Electrochemical Society, 1988, 145(6), 2149". When $Li_xCoO_2$ is delithiated to a Li concentration of less than x=0.4 and close to x=0.2 (at 4.55V), its O3 host transforms to a hybrid structure between rhombohedral $LiCoO_2$ (O3 structure) and hexagonal $CoO_2$ (O1 structure). In the hybrid structure, the Li ions reside in the planes with an O3 environment, while the vacancies have an O1 environment. In the voltage profile, there is a large plateau generally appearing at Li concentrations close to 0.2 (or at a voltage of about 4.55V), which corresponds to the two phase region between O3 and H1-3. The appearance of a two-phase plateau can obviously increase the specific capacity. However, the structural transition between O3 and H1-3 at high voltage induces $CoO_2$ plane-gliding and eventually leads to structural instability during cycling. This invention observes that the length of the two-phase plateau is related to the stability of material during cycling at high voltage, and a plateau that is too extended would result in fast fading. Otherwise, if the plateau is too small the reversible capacity of the cathode is less. By doping and coating as well as special preparation techniques the nature of the O3 to H1-3 transition plateau is affected.

In one embodiment, the $LiCoO_2$-based cathode also contains Nickel and Manganese. The Ni—Mn is enriched at the surface of the $LiCoO_2$ particles, some of the Ni—Mn can be present in separated Li—Ni—Mn—Co particles. This material is applied as cathode material in a coin cell test with a voltage range of 4.4-4.61V. Its voltage profile presents a reduced two-phase plateau and better cycling stability when compared with bare $LiCoO_2$-based materials. Thus, the modified $LiCoO_2$-based powders in the present invention possess an optimized nature of O3 to H1-3 transition, which is beneficial to balance capacity and cyclability properties. The doped or surface-modified $LiCoO_2$-based powders in the present invention yield an improved stability in floating tests. In one embodiment, an NMC-coated $LiCoO_2$-based powder has only a small quantity of Co dissolved when used under a constant voltage of 4.4V at 50° C. for long time. Accordingly, such improved $LiCoO_2$-based powders are good candidate cathode materials for use under high voltage. There is an intimate relation between the good performance of high V based LiCoO2 materials of this invention and the size of the H1-3 transition. Suitable compositions which give the right quantity of H1-3 phase transition are the lithium metal oxides that are described in the Summary.

The modified $LiCoO_2$-based powders according to the invention are applied as positive electrodes in full cell configuration and tested in high temperature storage tests. The results prove that full cells with such cathode materials have a satisfying stability under high temperature storage if SN is added to the electrolyte. As is shown further on, it is observed that SN strongly builds up the impedance of cells during storage tests at 60° C. The increased impedance will heavily affect the further cycling performance at normal temperature. To explain in more detail: a battery which contains a high V $LiCoO_2$ cathode and SN in the electrolyte works well if cycled or stored at relatively high temperature. Resistive impedance layers build up but—due to faster kinetics at higher T—the impedance can be tolerated. The same battery also works well if cycled or stored at lower temperature. Here—even if SN is present in the electrolyte—the build-up of impedance happens very slowly and the battery can operate well for a long time. However, a charged battery which contains a high V LiCoO$_2$ cathode and SN in the electrolyte stored at higher temperature will show severe deterioration when used at lower temperature. At high T the impedance layers build up fast and at low temperature the build-up layers deteriorate significantly the performance.

Typical battery tests tend to overlook this issue—for example a battery is typically tested by cycling or storing at either high or low temperature. However changing temperatures are typical in practical use. Therefore it is essential to achieve a good storage performance—prior art teaches that SN is a good additive to achieve this—but the good storage properties must be achieved with less build-up of resistive impedance layers. The current invention discloses that a combination of high V LiCoO$_2$ based cathode, SN additive and LiBOB additive achieves this. Particularly there is a synergetic effect between LiBOB and SN. The good storage is preserved but less impedance build-up is observed.

In one embodiment, a combination of SN and LiBOB serves as electrolyte additive in a standard solvent composition of EC (ethylene carbonate): DEC (diethyl carbonate): FEC (mono-fluoroethylene carbonate) with a weight ratio of 23.8:71.4:4.8. The storage test of a full cell with such electrolyte system shows little self-discharge and much reduced impedance. It is believed that the addition of LiBOB to the full cell system prevents the build-up of the impedance. As is known from the literature, LiBOB tends to be oxidized on the cathode surface at high voltage and to form a passivating film. SN is also in favor of reacting with transition metals on a cathode surface due to the existence of its lone pair of two electrons. It is believed that the addition of LiBOB leads to a "competition" between SN and LiBOB that buffers the resistance caused by the reaction of SN with the cathode surface during HT-storage.

In other embodiments, it is also discovered that the addition of PRS (propene sultone) or VC (vinylene carbonate) has a slight effect on reducing impedance. It can be imagined that the addition of PRS or/and VC would benefit the storage property of full cells, where LiBOB and SN serve as additives, standard solvent systems such as EC/DEC/FEC are used as solvent, and surface-modified LiCoO$_2$-based powders according to the invention are applied as positive electrode.

Therefore, this invention provides rechargeable lithium ion battery devices where the electrolytes contain the additives LiBOB and SN with positive electrodes comprising high voltage LiCoO$_2$ based cathodes which show a H1-3 phase transition between 4.35 and 4.42V. The LiCoO$_2$ based cathode materials are described in the Summary. This electrochemical device not only possesses a high capacity and a satisfying stability during cycling at elevated voltage, but also performs well in HT storage. It has little self-discharge. Particularly, it has little impedance build-up. Thus, it can be stably and repeatedly used for applications requiring a high energy density.

The following description details the analysis tests:

Coin Cell Making

Electrodes are prepared as follows: about 27.27 wt % of active cathode material, 1.52 wt % polyvinylidene fluoride polymer (KF polymer L #9305, Kureha America Inc.), 1.52 wt % conductive carbon black (Super P, Erachem Comilog Inc.) and 69.70 wt % N-methyl-2-pyrrolidone (NMP) (from Sigma-Aldrich) are intimately mixed by means of high speed homogenizers. The slurry is then spread in a thin layer (typically 100 micrometer thick) on an aluminum foil by a tape-casting method. After evaporating the NMP solvent, the cast film is processed through a roll-press using a 40 micrometer gap. Electrodes are punched from the film using a circular die cutter measuring 14 mm in diameter. The electrodes are then dried overnight at 90° C. The electrodes are subsequently weighed to determine the active material loading. Typically, the electrodes contain 90 wt % active materials with an active materials loading weight of about 17 mg (~11 mg/cm$^2$). The electrodes are then put in an argon-filled glove box and assembled within a 2325-type coin cell body. The anode is a lithium foil having a thickness of 500 micrometers (origin: Hosen); the separator is a Tonen 20MMS microporous polyethylene film. The coin cell is filled with a 1M solution of LiPF$_6$ dissolved in a mixture of ethylene carbonate and dimethyl carbonate in a 1:2 volume ratio (origin: Techno Semichem Co.).

Coin Cell Test

In this invention, each coin cell is cycled at 25° C. using Toscat-3100 computer-controlled galvanostatic cycling stations (from Toyo). The coin cell testing schedule used to evaluate the Examples below is detailed in Table 1. The schedules use a 1 C current definition of 160 mA/g. Within all the cycles, the charging step is conducted in constant current-constant voltage mode (CCCV), while discharge mode is operated in constant current mode (CC). During the 1$^{st}$ cycle, the initial charge capacity CQ1 and discharge capacity DQ1 are measured at 0.1 C in the 4.61-3.0V/Li metal window range. A rest time of 30 minutes is allowed between each charge and discharge. Then, the cells are tested by a segment cycling method in the 2$^{nd}$-99$^{th}$ cycles at 0.2 C within the voltage range of 4.61~4.40V/Li metal. At last, the cells are checked with the same condition as the 1$^{st}$ cycle. Capacity fading is calculated by comparing the 1$^{st}$ and 100$^{th}$ cycle's discharge capacity and can be expressed in the following equation (1):

$$QFad. = \left(1 - \frac{DQ100}{DQ1}\right) \times 100\% \quad (1)$$

TABLE 1

Schedule of Coin cell test

| | Charge | | | | Discharge | | | |
|---|---|---|---|---|---|---|---|---|
| Cycle No | C Rate | End current | Rest (min) | V/Li metal (V) | C Rate | End current | Rest (min) | V/Li metal (V) |
| 1 | 0.1 | 0.05 C | 30 | 4.61 | 0.1 | — | 30 | 3.0 |
| 2-99 | 0.2 | 0.05 C | 10 | 4.61 | 0.2 | — | 10 | 4.4 |
| 100 | 0.1 | 0.05 C | 30 | 4.61 | 0.1 | — | 30 | 3.0 |

1 C = 160 mA/g

Full Cell Preparation 200 mAh pouch-type cells are prepared as follows: the positive electrode active material powder is prepared according to the invention; Super-P (Super-PTM Li commercially available from Timcal), and graphite (KS-6 commercially available from Timcal) as positive electrode conductive agents and polyvinylidene fluoride (PVDF 1710 commercially available from Kureha) as a positive electrode binder are added to NMP (N-methyl-2-pyrrolidone) as a dispersion medium so that the mass ratio of the positive electrode active material powder, the positive electrode binder and the positive electrode conductive agent is 96/2/2. Thereafter, the mixture is kneaded to prepare a positive electrode mixture slurry. The resulting positive electrode mixture slurry is then applied onto both sides of a positive electrode current collector, made of a 15 µm thick aluminum foil. Typical cathode active material loading weight is 12.9 mg/cm². The electrode is then dried and calendared. The typical electrode density is 4.1 g/cm³. In addition, an aluminum plate serving as a positive electrode current collector tab is arc-welded to an end portion of the positive electrode.

Commercially available negative electrodes are used. In short, a mixture of graphite, CMC (carboxy-methyl-cellulose-sodium) and SBR (styrene butadiene-rubber), in a mass ratio of 96/2/2, is applied on both sides of a copper foil. A nickel plate serving as a negative electrode current collector tab is arc-welded to an end portion of the negative electrode. The typical cathode and anode discharge capacity ratio used for cell balancing is 0.75. Non-aqueous electrolyte is obtained by dissolving lithium hexafluorophosphate (LiPF$_6$) salt at a target concentration in a premixed solvent containing additives according to the invention. A sheet of the positive electrode, a sheet of the negative electrode, and a sheet of separator made of a 20 µm-thick microporous polymer film (Celgard® 2320 commercially available from Celgard) interposed between them are spirally wound using a winding core rod in order to obtain a spirally-wound electrode assembly. The wounded electrode assembly is then put in an aluminum laminated pouch in an air-dry room. The non-aqueous electrolyte solution is impregnated for 8 hrs at room temperature. The battery is pre-charged at 15% of its theoretical capacity and aged during 1 day, also at room temperature. The battery is then degassed using a pressure of −760 mm Hg for 30 sec, and the aluminum pouch is sealed.

Full Cell Cycling Test

The full cell is cycled at 45° C. (=HT) using Neware BTS-4008 computer-controlled galvanostatic cycling stations between 3.0V and 4.5V under CC/CV (constant current/constant voltage) mode at 0.1 C rate (corresponding to the current which discharges a charged cell within 10 hr).

High Temperature Storage Test

To test and monitor the stability of LiCoO$_2$-based cathode material at elevated voltages, it is typical to use the method of charge-discharge cycling under high voltage, and storing batteries at high temperature. When they are used, it is common that batteries are exposed to a high temperature environment for a period, so it is important to check the stability of batteries working and being stored at high temperature. In a storage test, the cells are firstly charged to a high cut-off voltage, and then stored at a high temperature like 60° C. During storage at high temperature, similar parasite reactions take place as in a cycling test at high voltage. With the cut-off voltage increasing, the side reactions accelerate and result in a fast self-discharge of the cells. This phenomenon can be observed from the voltage drop during storage and the retained capacity measured after storage. In a storage test, cells are normally treated with one cycle of charge/discharge/charge before and after a period of storage, in order to check the stability of the cells through capacity fading. Retained capacity and recovered capacity are two parameters to evaluate the stability of the cells, which are calculated from the charge and discharge capacity after storage. Currently, the recovered capacity tends to be considered as the only standard property to judge the storage performance, and retained capacity tends to be ignored. This originates from the idea that as long as cells can be recharged, there is no need to worry about the remaining capacity. In reality, if a fast self-discharge due to parasite reactions happens during storage, it cannot be observed from the recovered capacity, but only from the retained capacity. If cells with such fast self-discharge are frequently recharged, the cell performance will deteriorate since the cells are damaged by parasite reactions. Thus, the retained capacity is an indicator to evaluate the stability of cells.

In this invention, the prepared 200 mAh pouch-type cells are tested by high temperature storage following the schedule in Table 2. The temperature is set at 60° C.

TABLE 2

Schedule of HT storage test

| Step No. | Status | Current (A) | Cut-off voltage (V) | Time | Symbol |
|---|---|---|---|---|---|
| 1 | CC-Charge | 0.02 | 4.4 | 16 hrs | PCQ1 |
| 2 | CC-Discharge | −0.02 | 3.0 | 16 hrs | DQ1 |
| 3 | CC-Charge | 0.02 | 4.4 | 16 hrs | CQ1 |
| 4 | Storage | — | — | 18 days | Storage 1 |
| 5 | CC-Charge | 0.02 | 4.4 | 16 hrs | PCQ2 |
| 6 | CC-Discharge | −0.02 | 3.0 | 16 hrs | DQ2 |
| 7 | CC-Charge | 0.02 | 4.4 | 16 hrs | CQ2 |
| 8 | Storage | — | — | 18 days | Storage 2 |
| 9 | CC-Charge | 0.02 | 4.4 | 16 hrs | PCQ3 |
| 10 | CC-Discharge | −0.02 | 3.0 | 16 hrs | DQ3 |

The cells are tested in two storage cycles. Before and after the period of storage, there is one cycle of charge/discharge/charge in order to calculate the retained and recovered capacity. The retained capacity after storage 1 is obtained by DQ2-PCQ2, and the recovered capacity after storage 1 can be measured from DQ2. In order to compare the storage performance of difference cells, these two parameters are normalized by DQ1. So, Normalized retained capacity of storage 1=($DQ2$−$PCQ2$)/$DQ1$;

Normalized recovered capacity of storage 1=$DQ2$/$DQ1$;

Normalized retained capacity of storage 2=($DQ3$−$PCQ3$)/$DQ1$;

Normalized recovered capacity of storage 2=$DQ3$/$DQ1$;

The thickness of the cell is measured before and after the high temperature storage to check the bulging behavior. The measurement is conducted by a digital thickness gauge.

AC Impedance Test

In order to check the impedance change after storage, AC impedance tests are conducted before and after high temperature storage at room temperature. The frequency is set from 100000 to 0.1 Hz with 25 points per decade. The obtained Nyquist plot is fitted based on an equivalent electric circuit model as shown in FIG. 1. Rs represents electrolyte resistance. R1 (or R2) and Q1 (or Q2) respectively stand for resistances and constant phase elements that model the behavior of double layer on the interface. W=Warburg diffusion. The total resistance is the sum of Rs, R1 and R2. This parameter is compared before and after storage, and the Increasing percentage of resistance is calculated as 100%*(Total resistance after storage-Total resistance before storage)/Total resistance before storage Floating Test In a recent technical report of "3M battery electrolyte HQ-115", a float charging method is used to test the stability of novel electrolytes at high voltage. The method is carried out by continuously charging LCO/graphite pouch cells or 18650 cells at 4.2V and 60° C. for 900 hours. The currents recorded under charge are compared. A higher current reflects more side reactions that occur, so this method is available to study the side reactions of a battery at high voltage. In "Energy Environment of Science, 6 (2013), 1806-1810", Zhang et al. use the float charging method to test the stability of electrolytes against oxidation, under a high voltage of 5 to 6.3V. Based on the above knowledge, by choosing a relatively stable electrolyte and anode material for the required charging voltage, this method can be used to study the stability of cathode material under high voltage, such as $LiCoO_2$-based material, where the metal dissolution can be reflected by the leakage current. Additionally, in "Nature Communication, 4:2437 (2013), doi: 10.1038/ncomms3437", Zhan et al. report that the dissolved manganese from lithium manganese oxide cathodes is deposited on the anode, and the deposited amount can be detected by inductively coupled plasma-atomic absorption spectrometry ICP-AAS, or by ICP-OES. These ICP tests can also be employed to study the Co dissolution of $LiCoO_2$-based material. Therefore, the float charging test associated with ICP measurement (referred to hereafter as "floating test") is a feasible way to evaluate the side reaction and Co dissolution of $LiCoO_2$-based cathode materials at high voltage.

This electrochemical test aims to analyze the stability of cathode materials at high voltage charging, for instance, 4.45V for $LiCoO_2$. In some embodiments, the tested cells configuration are coin cells that are assembled as follows: two separators (from SK Innovation) are located between a positive electrode and a negative electrode. 1M LiPF6 in EC/DMC (1:2) is used as an electrolyte, dropped between separator and electrodes. The prepared coin cell is tested according to the following charge protocols: the coin cell is first charged to a defined upper voltage at constant current mode and C/20 rate (with 1 C=160 mAh/g), is then kept at the constant upper voltage for 5 days or more at high temperature (50° C.). After the floating test, the coin cell is disassembled. The anode and separator close to the anode are analyzed by ICP to assess the metal dissolution, since the prior art described that if metal dissolution happens, the dissolved metal will be deposited on the surface of the anode in metal or metal alloy form.

Figure 2:
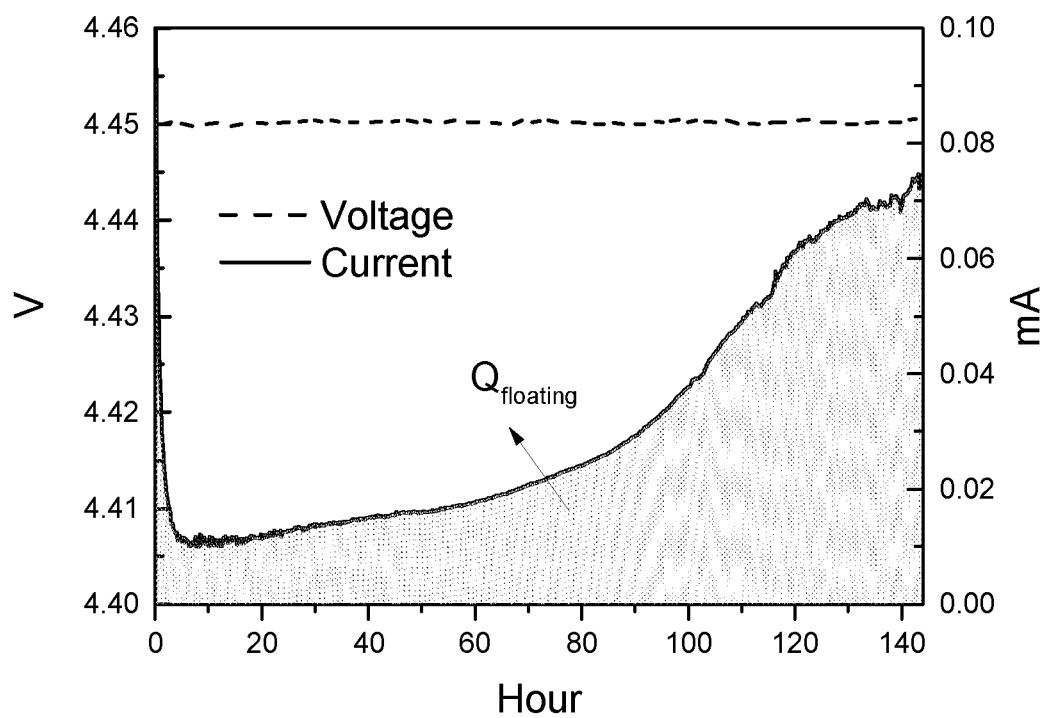
FIG. 2: Scheme of floating test result.

FIG. 2 displays the results of a typical floating test. First the cathode is charged (data not shown) under constant current (CC) mode. When the final voltage is reached, the cell is continuously charged under constant voltage (CV) mode. The graph shows the current, where t=0 is the time were the CV mode charging starts. Once side reaction or metal dissolution happens, there will be a voltage drop. The electrochemical instrument will automatically compensate the current to keep the voltage constant. Therefore the recorded current is a measure of the ongoing side reactions. As shown in FIG. 2, the left y-axis stands for applied voltage to coin cells, and the right y-axis represents the recorded floating current. In the Figure, time starts from the beginning of constant voltage charge, the recorded voltage and floating current are respectively represented by dash and solid lines. From the change of the current one can observe the degradation of tested coin cell during floating. The $Q_{floating}$—integral of current—may qualitatively describe how severe the metal dissolution is in the tested coin cell. Thus, this specific floating capacity is a key factor to evaluate the stability of cathode material at high charging voltage.

The invention is further illustrated in the following examples:

Example 1

This example presents aluminum, titanium and magnesium doped $LiCoO_2$-based powder. This material is manufactured as follows:
1) Preparation of a Mg and Ti-doped $LiCoO_2$-based core: $Li_2CO_3$, $Co_3O_4$, MgO and $TiO_2$ powders are homogeneously mixed in a molar ratio of 1.1/1.0/0.0025/0.0025. The mixture is then fired at 990° C. for 10 hr in air flow of 4 $m^3$/kg. The sintered product is milled and classified resulting in a powderous materials with an average particle size D50 of 18 μm. The final Li:Co molar ratio is measured as 1.079 by ICP.
2) Preparation of Li-stoichiometrically controlled layered lithium cobalt oxide particles with complex Mg, Al and Ti spatial distribution: $Co_3O_4$ is introduced into the product from step 1) in a cobalt molar fraction of Co($Co_3O_4$)/Co (product from step 1))=13.04%/86.96%. MgO, $Al_2O_3$ and $TiO_2$ powders are added to the sintered product from step 1) to achieve a molar content of 1%/1%/0.283% (Mg/Al/Ti) vs. total Co. $Li_2CO_3$ is introduced to precisely control the Li stoichiometry to achieve a molar ratio of Li/(Co+Al+Mg)=0.990 or Li/(Co+Al)=1.000. The mixture is then fired at 980° C. in air for 10 hr in a box-type furnace. The furnace is naturally cooled down to room temperature and at a rate of −5K/min. The black sintered powder is ground and sieved using 270-mesh sieve. The mean particle size is measured by PSD with a result of around 17 μm. The product is stored in sealed laminated bags to protect from moisture uptake and subsequent degradation. The above prepared powder is named Ex1. It is applied as cathode material in the coin cell configuration and tested following the description of "Coin cell test" and "Floating test".

Example 2

This example presents NMC coated $LiCoO_2$-based powder. This material is manufactured as follows:
1) Preparation of a Mg and Al doped $LiCoO_2$-based core: lithium carbonate, tricobalt tetroxide, magnesium carbonate and aluminum oxide are mixed in a molar ratio of 1.05/0.98/0.01/0.01 using pilot scale equipment. 3.2 kg of the mixture is then put in a 5.9 L mullite sagger and fired at 980° C. for 12 h in an air flow of 4 $m^3$/kg. The sintered cake is milled and classified resulting in a powderous material with an average particle size D50=21.4 μm and a D100=71.0 μm, with a general composition of $Li_{1.05}Co_{0.98}Mg_{0.01}A_{0.01}O_2$.
2) Preparation of core-shell $LiCoO_2$-based materials: the Mg and Al doped $LiCoO_2$-based core powder is further mixed with $Ni_{0.55}Mn_{0.3}Co_{0.15}(OH)_2$ powder with a D50 of 3 μm in a molar ratio of 95/5. 3.0 kg of mixture is put in a 2.3 L mullite sagger and fired at 1000° C. for 8 hr in air. The sintered cake is milled and classified resulting in a powderous material with a BET surface area of 0.22 $m^2$/g. The chemical composition of the final product is determined with inductively coupled plasma atomic emission spectroscopy and results in a Li, Co, Ni, Mn, Al and Mg molar ratio of 0.99/0.940/0.028/0.015/0.009/0.009, which is in very good agreement with theoretical expectations. The above prepared powder is named Ex2. It is applied as cathode material and tested following the description of "Coin cell test" and "Floating test".

Counter Example 1

This example presents Al-, Ti- and Mg-doped LiCoO$_2$-based powder. This material is manufactured following the same steps as the preparation of Ex1 except that in the second step the molar content of MgO, Al$_2$O$_3$ and TiO$_2$ powders vs. total Co is changed to 0.18%/0.348%/0.283% (Mg/Al/Ti). The prepared powder is named CEx1. It is applied as cathode material and tested following the description of "Coin cell test" and "Floating test".

Discussion of Example 1, Example 2 and Counter Example 1

Figure 3:
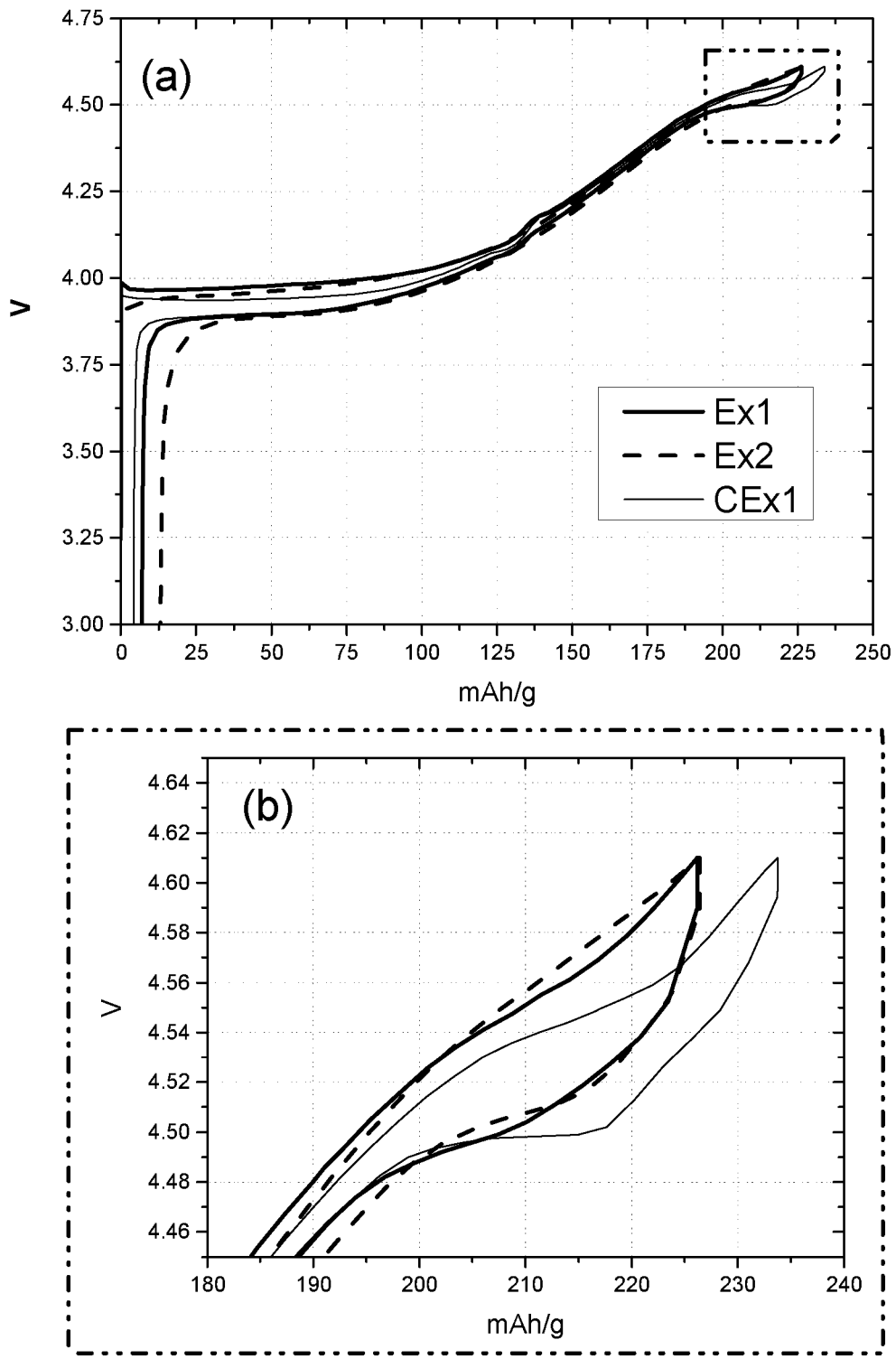
FIG. 3: (a) Voltage profile of Ex1, Ex2 and CEx1 in the voltage range of 3.0-4.61V; (b) Enlarged graph of FIG. 3(a) in the voltage range of 4.45-4.61V.

Table 3 lists the coin cell and floating test results of sample Ex1, Ex2 and CEx1. Coin cell tests provide charge and discharge capacity (CQ1 and DQ1) in the first cycle, and capacity lost after 98 times of cycling at 0.2 C in the voltage range of 4.4 to 4.61V. The charge capacities of sample Ex1 and Ex2 are smaller than the value of sample CEx1, as is the case also for discharge capacity. This phenomenon can also be observed from FIG. 3, where graph (a) shows the 1$^{st}$ cycle voltage profile of these samples and graph (b) is the enlarged right-top part of graph (a). The thick solid line is the voltage curve of sample Ex1, the thin solid line is for sample CEx1 and the dash line represents sample Ex2. All these curves indicate the appearance of the H1-3 transition by showing a voltage plateau around 4.5 V, as seen in FIG. 3 (b). The length of the voltage plateau is estimated by capacity difference between the points at 4.47V and 4.52V of the voltage curve in FIG. 3 (b). The results are summarized in Table 4. CEx1 has a capacity difference of 27.2 mAh/g between 4.47V and 4.52V, while Ex1 and Ex2 have close values around 22 mAh/g. Compared to Ex1 and Ex2, the H1-3 transition plateau of CEx1 is longer. Since the three samples are tested in the same voltage range, the one with the longer plateau would have a greater capacity. Thus, CEx1 presents a better performance in terms of charge and discharge capacity.

Figure 4:
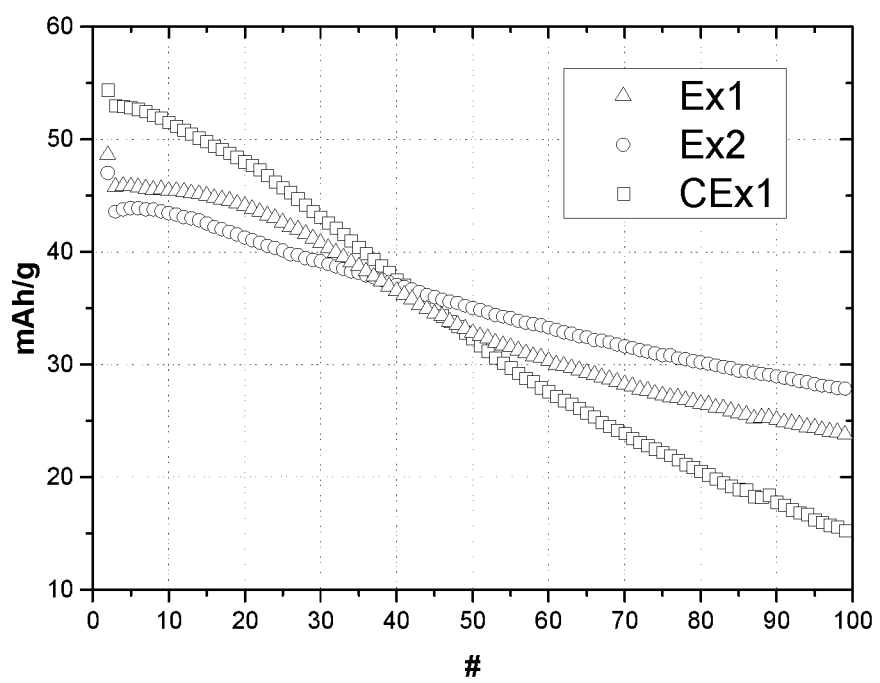
FIG. 4: Cyclability of Ex1, Ex2 and CEx1 in the voltage range of 4.40-4.61V.

However, the coin cell performance is not only determined by the factor of charge/discharge capacity at the 1$^{st}$ cycle. When checking the cyclability by using formula (1) and capacities obtained at cycle 1 and 100 from Ex1, Ex2 and CEx1, CEx 1 shows a capacity fading of around 12%, which is higher than both values of Ex1 and Ex2. FIG. 4 records the discharge capacity of the three samples cycling between 4.4V to 4.61V, which corresponds to the step of the 2$^{nd}$-99$^{th}$ cycles in Table 1. In the figure, the triangle symbol is for sample Ex1, the circle symbol for sample Ex2 while the square symbol is for sample CEx1. During the 98 cycles, the discharge capacity of CEx1 deteriorates fast and much worse when compared to the other samples. Accordingly, sample CEx1 possesses a high capacity due to its long plateau of H1-3 transition, but its cycling performance is not satisfying.

Figure 5:
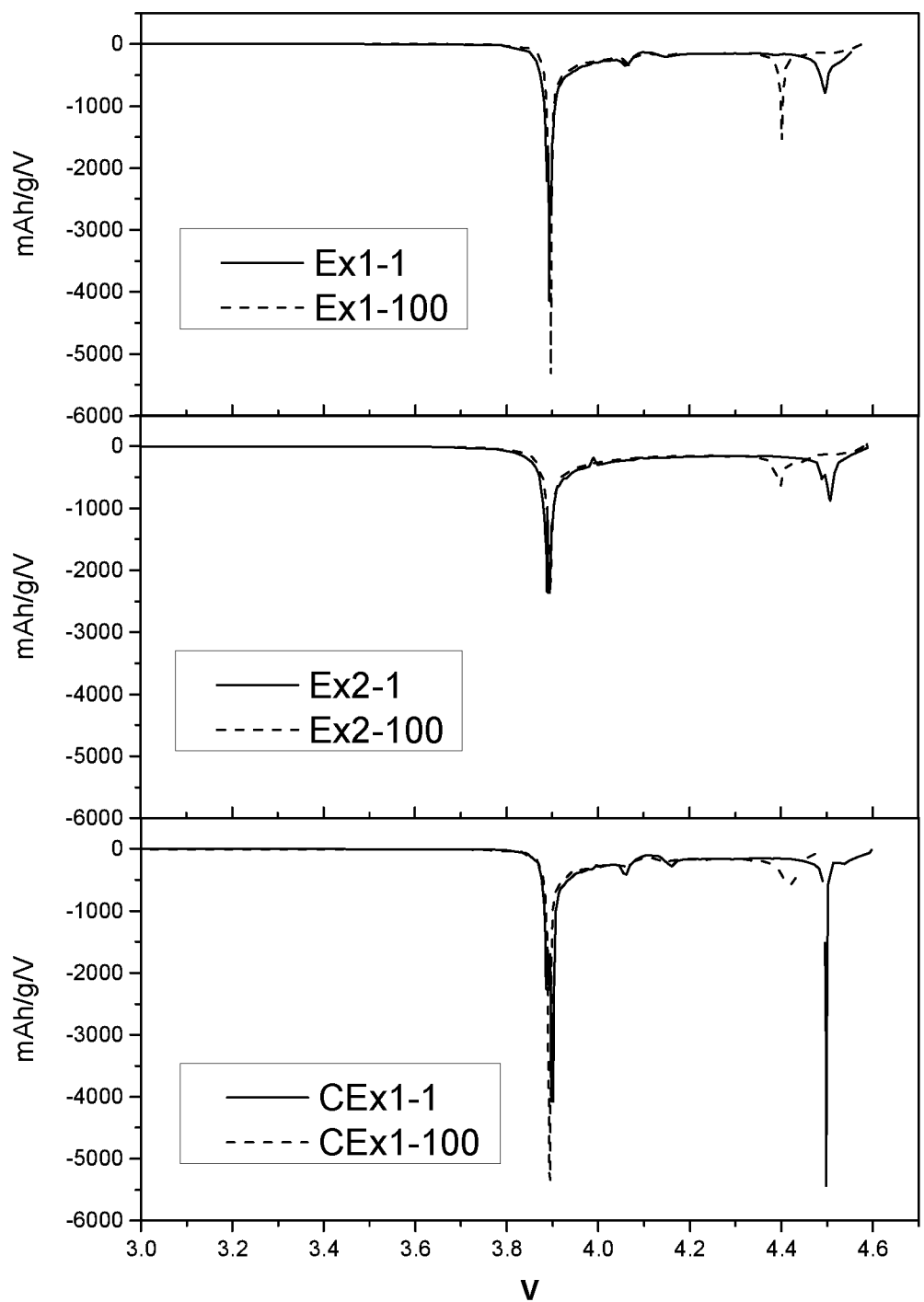
FIG. 5: Plots of dQ/dV vs. voltage of Ex1, Ex2 and CEx1 in the voltage range of 3.0-4.61V.

Possibly, one of the reasons is the shrinkage of the H1-3 transition plateau. FIG. 5 shows the plots of dQ/dV in the 1$^{st}$ and 100$^{th}$ discharge of the coin cell test. From top to bottom, the plot corresponds to samples Ex1, Ex2 and CEx1, resp. In the plot, the solid line represents the change of dQ/dV in the 1$^{st}$ cycle while the dashed line is for the 100$^{th}$ cycle. In the 1$^{st}$ cycle, CEx1 has a steep peak at around 4.5V, while plots of Ex1 and Ex2 have much smaller peaks at the same position. This confirms the observation of the H1-3 transition plateau in FIG. 3. In the 100$^{th}$ cycle, all the H1-3 transition peaks shift to a lower voltage. The H1-3 transition peak of CEx1 is shortened to a height similar to Ex1 and Ex2. This indicates the shrinkage of the H1-3 transition plateau of CEx1 during cycling and implies the poor stability of CEx1 in the coin cell test. The differential curves of the 1$^{st}$ cycle voltage profile of Ex1 and Ex2 have the following characteristics:

a dQ/dV<700 mAh/gV in the 4.40V to 4.70V voltage range vs. Li metal during the first charge at C/10 rate, and a dQ/dV<2000 mAh/gV in the 4.40V to 4.70V voltage range vs. Li metal during the first discharge at C/10 rate.

Figure 6:
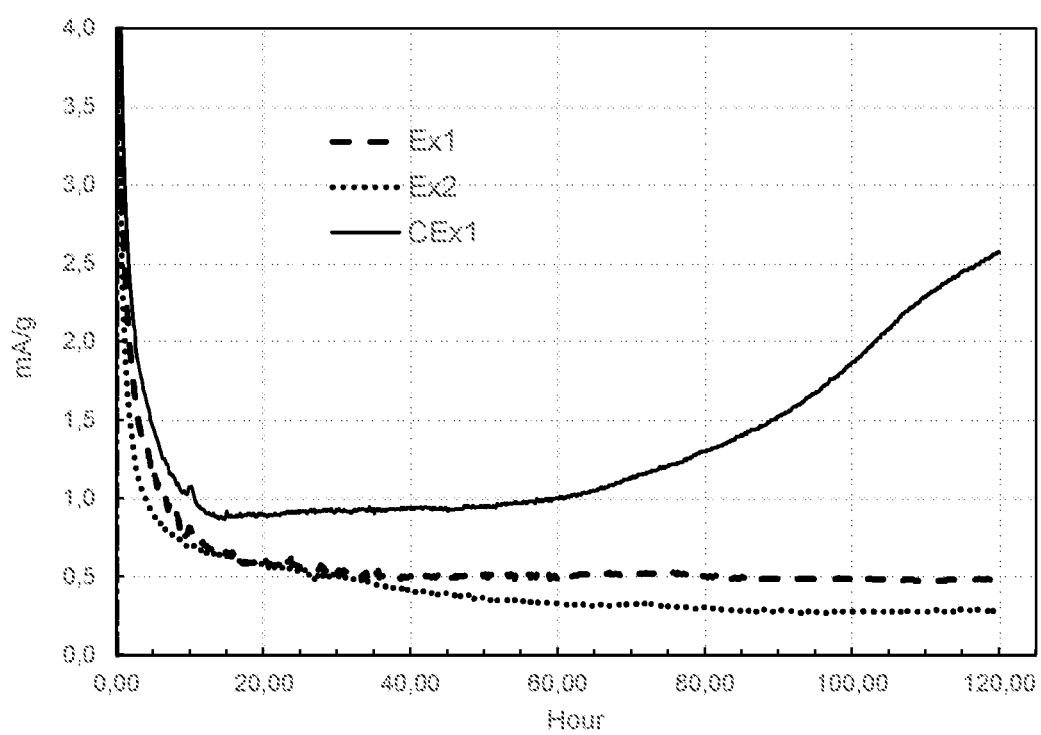
FIG. 6: Plot of floating current vs. time of Ex1, Ex2 and CEx1.

According to the above discussion, it can be concluded that the plateau of H1-3 transition in LiCoO$_2$-based material has to be optimized so as to achieve a high capacity together with acceptable cyclability during cycling at high voltage. The stability of sample Ex1, Ex2 and CEx1 at high voltage and high temperature are further checked following the description of "Floating test". FIG. 6 illustrates the recorded current change when cells are charged at constant voltage of 4.45V at 50° C. In the figure, the results of Ex1, Ex2 and CEx1 are represented by dash, dot and solid lines respectively. CEx1 clearly has a much larger floating current compared to Ex1 and Ex2. After the disassembly of the cells the metal content of the anode is measured by ICP. The integrated capacities and masses of Co that are deposited on the anode during floating are listed in Table 3. CEx1 thus loses more integrated capacity due to its large current and has more Co dissolved and deposited on the anode during the test. Ex1 and Ex2 have a much higher stability when charged at high voltage and elevated temperature. Thus, both the higher Mg and Al doping content and NMC coating have positive effects on improving the stability of LCO-based cathode material when applied at high voltage conditions. Therefore, Ex1 and Ex2 are promising LCO-based cathode materials for high voltage application.

TABLE 3

| | Coin cell and floating result of Ex1, Ex2 and CEx1 | | | | | |
|---|---|---|---|---|---|---|
| Sample | CQ1 at 4.61 V (mAh/g) | DQ1 at 4.61 V (mAh/g) | DQ100 at 4.61 V (mAh/g) | Capacity Fading at 4.61 V (%) | $Q_{floating}$ (mAh/g) | Co dissolution (mg) |
| Ex1 | 226.1 | 219.2 | 198 | 9.65 | 71.68 | 0.1056 |
| Ex2 | 226.6 | 213.4 | 193.6 | 9.28 | 53.06 | 0.0571 |
| CEx1 | 233.5 | 229.2 | 201 | 12.32 | 163.57 | 0.5035 |

TABLE 4

Length of H1-3 transition plateau of Ex1, Ex2 and CEx1

| Sample | Capacity at 4.47 V (mAh/g) | Capacity at 4.52 V (mAh/g) | Capacity difference between 4.47 V and 4.52 V (mAh/g) |
|---|---|---|---|
| Ex1 | 34.10 | 11.40 | 22.70 |
| Ex2 | 33.12 | 11.07 | 22.05 |
| CEx1 | 40.86 | 13.66 | 27.20 |

Example 3: Electrolyte with Additives of SN and LiBOB

This example presents a rechargeable lithium ion battery prepared following the description in "Full cell preparation", where the electrolyte comprises:
(a) A non-aqueous solvent: ethylene carbonate (EC)/diethyl carbonate (DEC) with a weight ratio of 3:7, with addition of 5 wt % mono-fluoroethylene carbonate (FEC);
(b) An electrolyte salt: 15 wt % of lithium hexafluorophosphate ($LiPF_6$);
(c) Electrolyte additives: 2 wt % of succinonitrile (SN) and 1 wt % of lithium bis(oxalato)borate (LiBOB);
The cathode active material is Ex1 in the "Example 1". The prepared 200 mAh pouch-type battery is named Cell 1. A comparative electrolyte that only consists of (a) and (b) is named Electrolyte 1.

Counter Example 2: Electrolyte with Additives of SN

This example presents a rechargeable lithium ion battery prepared through the same procedure as Cell 1, except that the electrolyte additives (c) only comprise 2 wt % of succinonitrile (SN). The prepared 650 mAh pouch-type battery is named Cell 2.

Counter Example 3: Electrolyte with Additives of SN and $LiBF_4$

This example presents a rechargeable lithium ion battery prepared through the same procedure as Cell 1, except that the electrolyte additives (c) only comprise 2 wt % of succinonitrile (SN) and 0.2 wt % of lithium tetrafluoroborate ($LiBF_4$). The prepared 650 mAh pouch-type battery is named Cell 3.

Counter Example 4: Electrolyte with Additives of SN and PRS

This example presents a rechargeable lithium ion battery prepared through the same procedure as Cell 1, except that the electrolyte additives (c) only comprise 2 wt % of succinonitrile (SN) and 0.5 wt % of propene sultone (PRS). The prepared 650 mAh pouch-type battery is named Cell 4.

Counter Example 5: Electrolyte with Additives of SN and VC

This example presents a rechargeable lithium ion battery prepared through the same procedure as Cell 1, except that the electrolyte additives (c) only comprise 2 wt % of succinonitrile (SN) and the solvent has been modified by adding 1 wt % of vinylene carbonate (VC). The prepared 650 mAh pouch-type battery is named Cell 5.

Counter Example 6: Electrolyte with Additives of SN and PS

This example presents a rechargeable lithium ion battery prepared through the same procedure as Cell 1, except that the electrolyte additives (c) only comprise 2 wt % of succinonitrile (SN) and 0.5 wt % of propane sultone (PS). The prepared 650 mAh pouch-type battery is named Cell 6.

Discussion of Example 3 and Counter Examples 2-6

Table 5 summarizes the electrolyte formulation of Cell 1 to Cell 6. (Cells 7-8: see below) These six batteries have the same cathode, anode, and electrolyte compositions, but different electrolyte additives.

TABLE 5

Summary of electrolyte formulation

| Cell ID | Electrolyte formulation (wt %) |
|---|---|
| Cell 1 (Ex3) | EC/DEC = 30/70 + 15% $LiPF_6$ + 5% FEC + 2% SN + 1% LiBOB |
| Cell 2 (CEx2) | EC/DEC = 30/70 + 15% $LiPF_6$ + 5% FEC + 2% SN |
| Cell 3 (CEx3) | EC/DEC = 30/70 + 15% $LiPF_6$ + 5% FEC + 2% SN + 0.2% $LiBF_4$ |
| Cell 4 (CEx4) | EC/DEC = 30/70 + 15% $LiPF_6$ + 5% FEC + 2% SN + 0.5% PRS |
| Cell 5 (CEx5) | EC/DEC = 30/70 + 15% $LiPF_6$ + 5% FEC + 2% SN + 1.0% VC |
| Cell 6 (CEx6) | EC/DEC = 30/70 + 15% $LiPF_6$ + 5% FEC + 2% SN + 0.5% PS |
| Cell 7 | EC/DEC = 30/70 + 15% $LiPF_6$ + 2% VC |
| Cell 8 | EC/DEC = 30/70 + 15% $LiPF_6$ + 2% VC + 2% SN |

Figure 7:
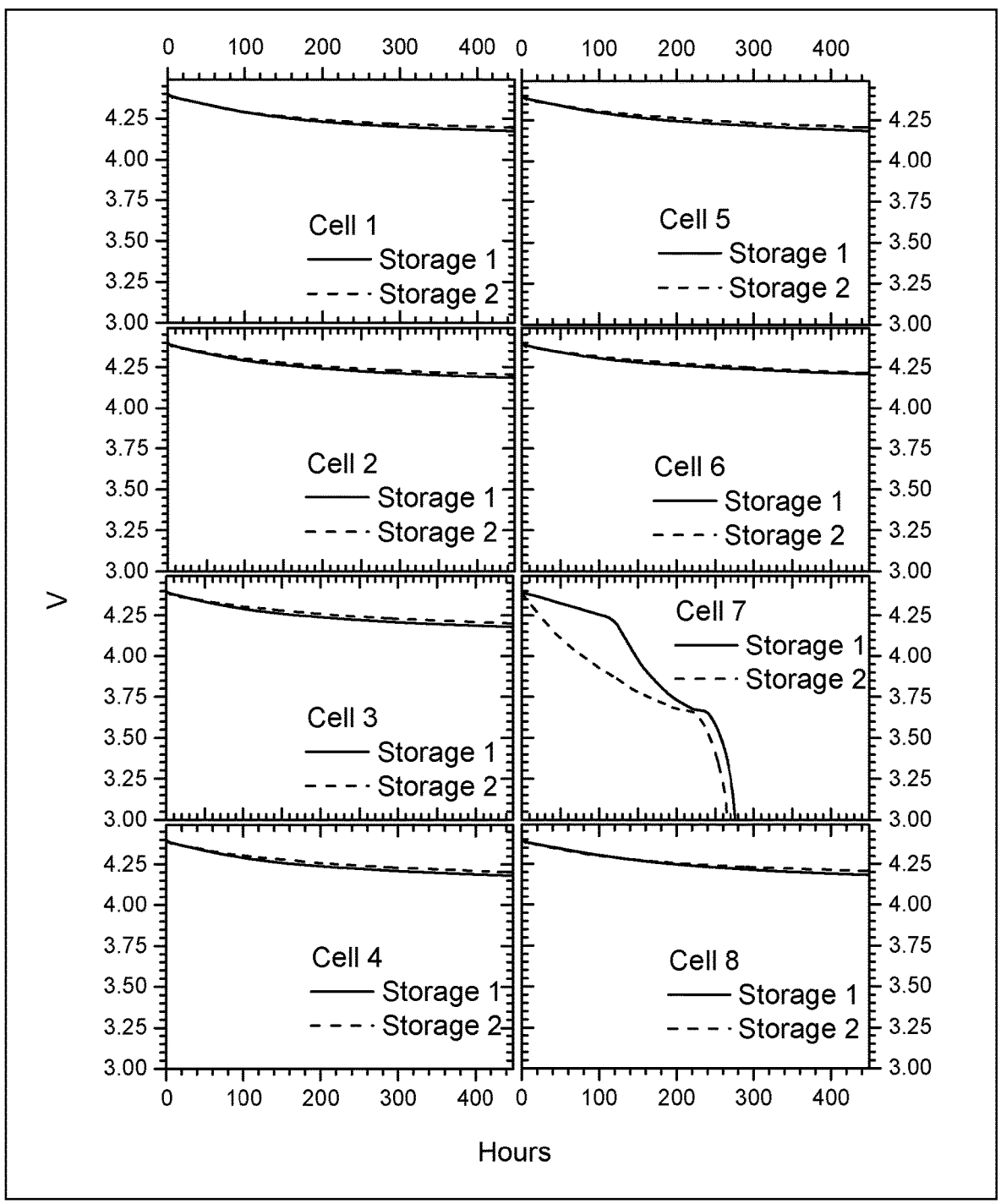
FIG. 7: Voltage change of cell 1 to cell 8 during Storage 1 and Storage 2.
Figure 8:
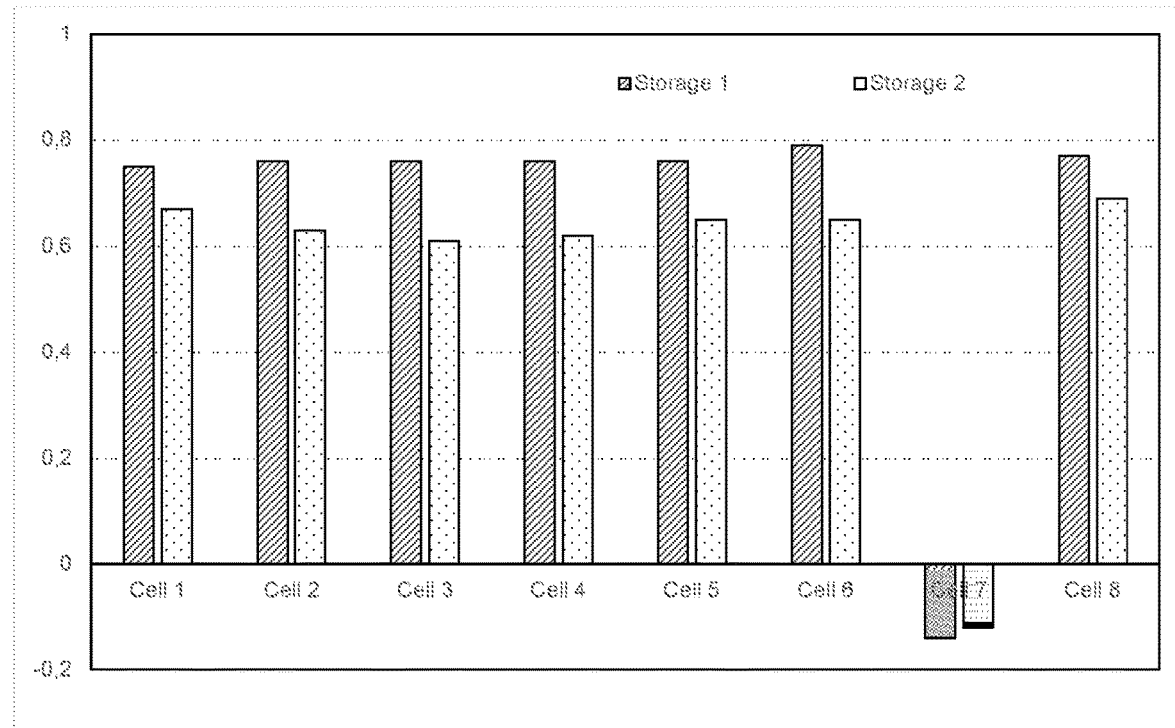
FIG. 8: Normalized retained capacity of cell 1 to cell 8 in storage test.
Figure 9:
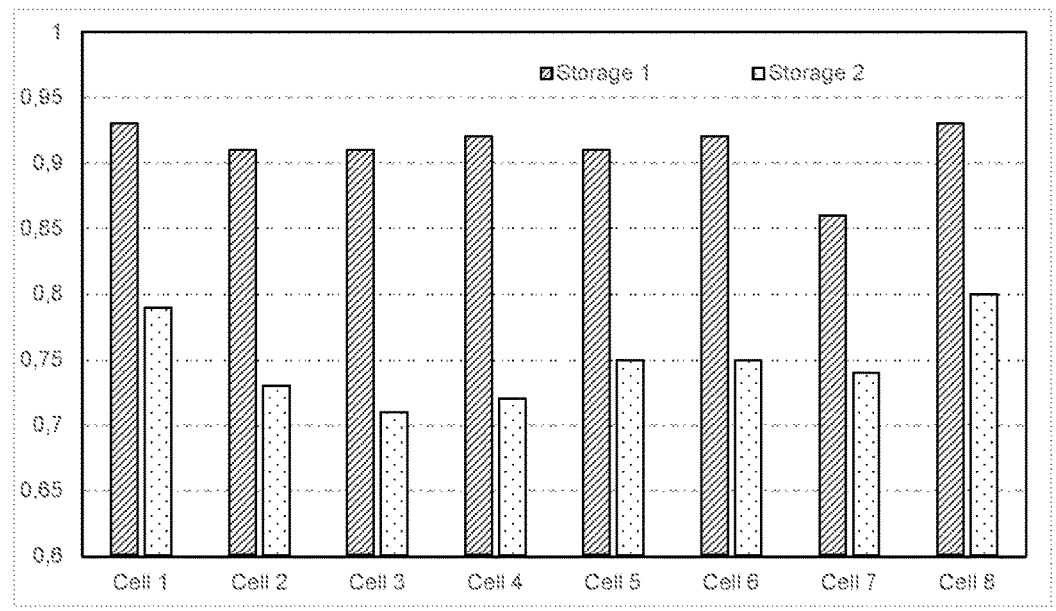
FIG. 9: Normalized recovered capacity of cell 1 to cell 8 in storage test.

The effect of the various additives is examined through a HT storage and an AC impedance test. Table 6 list the storage results of Cell 1 to Cell 6. FIG. 7 illustrates the change of voltage of Cell 1 to Cell 6 during storage 1 and storage 2. FIG. 8 plots the normalized retained capacity of Cell 1 to 6 after storage 1 and storage 2. FIG. 9 presents the normalized recovered capacity of Cell 1 to 6 after storage 1 and storage 2. It seems that all of Cells 1 to 6 have quite close retained and recovered capacities, and similar and negligible voltage change during storage 1 and storage 2. This can be due to the presence of SN, which is confirmed to have a positive effect on storage performance and described hereafter.

TABLE 6

Summary of storage performance

| Cell ID | [1]Norm. Retained capacity in storage 1 | Normalized Retained capacity in storage 2 | [2]Norm. Recovered capacity in storage 1 | Norm. Recovered capacity in storage 2 |
|---|---|---|---|---|
| Cell 1 | 0.75 | 0.67 | 0.93 | 0.79 |
| Cell 2 | 0.76 | 0.63 | 0.91 | 0.73 |
| Cell 3 | 0.76 | 0.61 | 0.91 | 0.71 |
| Cell 4 | 0.76 | 0.62 | 0.92 | 0.72 |
| Cell 5 | 0.76 | 0.65 | 0.91 | 0.75 |
| Cell 6 | 0.79 | 0.65 | 0.92 | 0.75 |

TABLE 6-continued

Summary of storage performance

| Cell ID | [1]Norm. Retained capacity in storage 1 | Normalized Retained capacity in storage 2 | [2]Norm. Recovered capacity in storage 1 | Norm. Recovered capacity in storage 2 |
|---|---|---|---|---|
| Cell 7 | −0.14 | −0.12 | 0.86 | 0.74 |
| Cell 8 | 0.77 | 0.69 | 0.93 | 0.80 |

[1]ratio of (DQ2 − PCQ2)/DQ1;
[2]ratio of DQ2/DQ1;
Norm. = normalized

Figure 10:
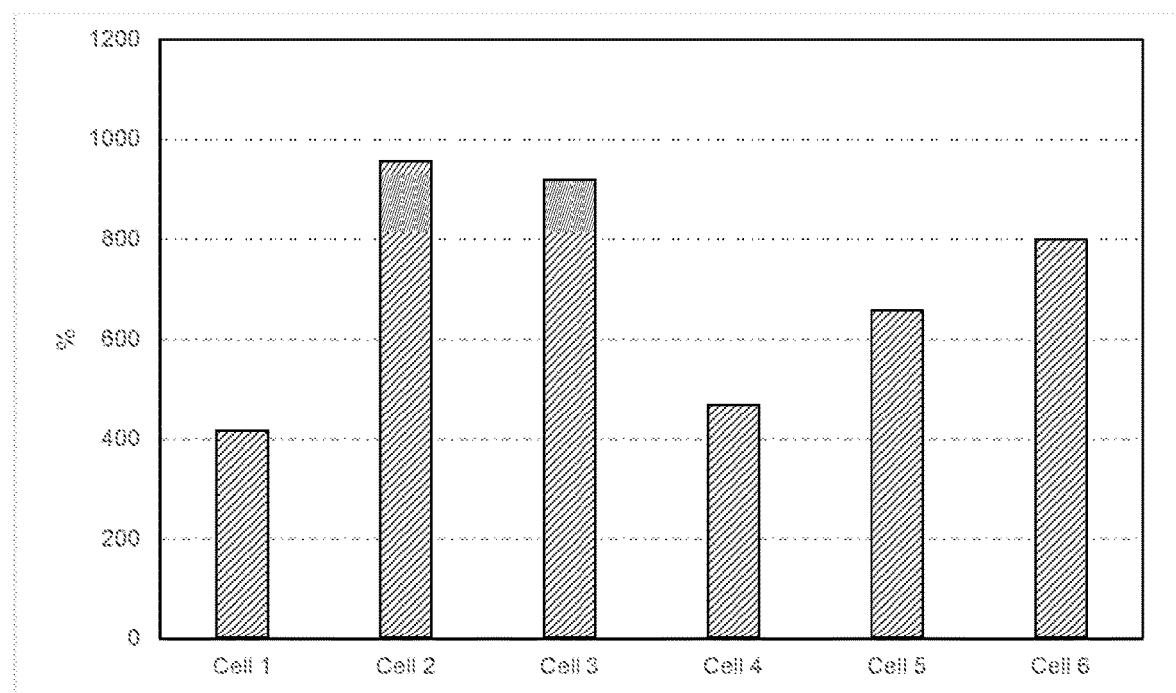
FIG. 10: Resistance increasing (percentage) after storage of cell 1 to cell 6.

Table 7 lists the resistances of Cell 1 to 6 measured before and after storage tests, and the resistance increasing percentage as described in "AC impedance test". Before storage, Cell 1 to 6 have quite close values of total resistance. After two cycles of storage, resistance has built up differently among these cells. FIG. 10 plots the resistance increasing percentage of Cells 1 to 6. From this figure, it can be concluded that Cell 1 has the lowest resistance increasing percentage, which is caused by the addition of LiBOB. Therefore, LiBOB can buffer the impedance build-up during storage at high temperature. The combination of LiBOB and SN as electrolyte additives can lead to low self-discharge and little impedance build-up when the battery is stored at high temperature.

TABLE 7

Summary of impedance performance

| Cell ID | Total resistance before storage (Ω) | Total resistance after storage (Ω) | *Resistance increasing (%) |
|---|---|---|---|
| Cell 1 | 0.342072 | 1.767745 | 416.78 |
| Cell 2 | 0.371926 | 3.930211 | 956.72 |
| Cell 3 | 0.362195 | 3.689863 | 918.75 |
| Cell 4 | 0.40168 | 2.284525 | 468.74 |
| Cell 5 | 0.332382 | 2.519689 | 658.07 |
| Cell 6 | 0.361598 | 3.254116 | 799.93 |

*= 100%*(Total resistance after storage − Total resistance before storage)/Total resistance before storage Explanatory Example 4: Effect of SN on HT Storage This example provides a rechargeable lithium ion battery prepared through the same procedure as Cell 2, except for the non-aqueous solvent containing 2 wt % VC instead of 5 wt % FEC and no electrolyte additives added. The above prepared battery is named Cell 7. This example also provides a rechargeable lithium ion battery prepared through the same procedure as Cell 7, with addition of 2 wt % of succinonitrile (SN) into the electrolyte. The prepared battery is named Cell 8. Cells 7 and 8 are submitted to high temperature storage and AC impedance tests so as to check the effect of SN on the stability of a battery at high voltage.

Table 6 shows the storage results, including the normalized retained and recovered capacities of storage 1 and storage 2. Contrary to the results for cells 1-6, cell 7 shows that— without SN additive a negative remaining capacity is achieved. However, the positive SN effect is countered by the observation that the presence of SN also builds up impedance when cells are stored at high temperature (compare for example cell 8 to cell 7 in Table 8 below).

It is clear that Cell 8 has a much greater normalized retained capacity compared to Cell 7 in both storage cycles (see also FIG. 8). The values of Cell 7 are even negative. We repeatedly observed negative remaining capacity for electrolytes without SN. Thus it is typical for SN free electrolytes. A negative remaining capacity means this cell underwent full self-discharge to below 3V during the storage test. As comparative example we only selected one result of electrolytes without SN.

The normalized recovered capacity of these two cells are quite close (see also FIG. 9). This does not mean that cell 7 and cell 8 have a similar high T performance. Cell 8 was a much longer time exposed to a high V (cell 7 fast self-discharged). Therefore Cell 8 is more robust during storage at high V. This is important for real use. Mobile phone typically apply a daily "charge-keep-use" approach. Cell 7 would only marginally self-discharge during <1 day and thus, cell 8 will sustain more cycles. It is difficult to tell the fast self-discharge issue of Cell 7 only from the recovered capacity data, which explains why it is necessary to check the retained capacity in a storage test.

FIG. 7 shows the voltage change of Cells 7 and 8 versus time during the storage steps. In Cell 7, there is an obvious voltage drop below 3V, while Cell 8 presents a negligible change of voltage in both storage cycles. This confirms that Cell 8 is more stable and has much less self-discharge when compared to Cell 7. Considering the difference of formulation between Cell 7 and 8, the improved performance of Cell 8 can be understood by the addition of SN. Therefore, electrolyte additive SN has a positive effect on stability of battery when stored at high temperature.

However, the addition of SN also brings certain negative effects. Table 8 shows the relative impedance change percentage after HT storage test. From Cell 1 to Cell 6, they contain the same solvent system which are EC/DEC/FEC-based. So taking the lowest impedance as base, which is Cell 1, the impedance increase of Cell 2 to Cell 6 are divided by the value of Cell 1, thereby obtaining the relative resistance increase. Cell 7 and Cell 8 have a different solvent system than Cell 1-6. Their electrolyte solvent is EC/DEC/VC-based. Taking Cell 7 as base, which has no SN addition, the relative impedance increase of Cell 8 is obtained from the ratio of impedance increase percentage of Cell 8 to the value of Cell 7. From the results in Table 9, it can be demonstrated that Cell 8 has larger impedance build-up during storage, when compared with Cell 7. Thus, the addition of SN plays a role in the growth of impedance during storage. Thus, it is necessary to find a solution to cut down impedance when employing SN to obtain good storage performance, which means negligible self-discharge and little build-up impedance.

TABLE 8

Summary of impedance performance

| Cell ID | Cell 1 | Cell 2 | Cell 3 | Cell 4 | Cell 5 | Cell 6 | Cell 7 | Cell 8 |
|---|---|---|---|---|---|---|---|---|
| Relative Resistance increase | 1 | 2.2955 | 2.2044 | 1.1247 | 1.5789 | 1.9193 | 1 | 1.8467 |

Example 5

This Example presents full cell cycling results of four full cells, wherein the cathode materials are the ones described in Ex1, Ex2, CEx1 and a commercial LiCoO$_2$ cathode material from Umicore Korea for the normal voltage application; the anode is graphite, the electrolyte comprises EC/DEC/LiPF$_6$/VC with a weight ratio of 25:58:15:2. The commercial LiCoO$_2$ has been prepared like the Mg and Ti-doped LiCoO$_2$-based core material in Example 1 with a single firing step, but has a different composition: Li$_{1.05}$Co$_{0.9895}$Mg$_{0.01}$Al$_{0.0005}$O$_2$. Full cell containing Ex1 is labelled Cell 9, full cell using Ex2 is labelled Cell 10, full cell using CEx1 is labelled Cell 11 and full cell using commercial LCO is labelled Cell 12. These full cells are prepared following the description in "Full cell preparation" and tested by "Full cell cycling test" for two cycles to check the phenomenon of H1-3 transition in full cells. The tests are conducted at 45° C. to have good kinetics. A 0.1 C-rate is set to make sure that the current is slow enough to observe the "plateau features" accurately.

Figure 11:
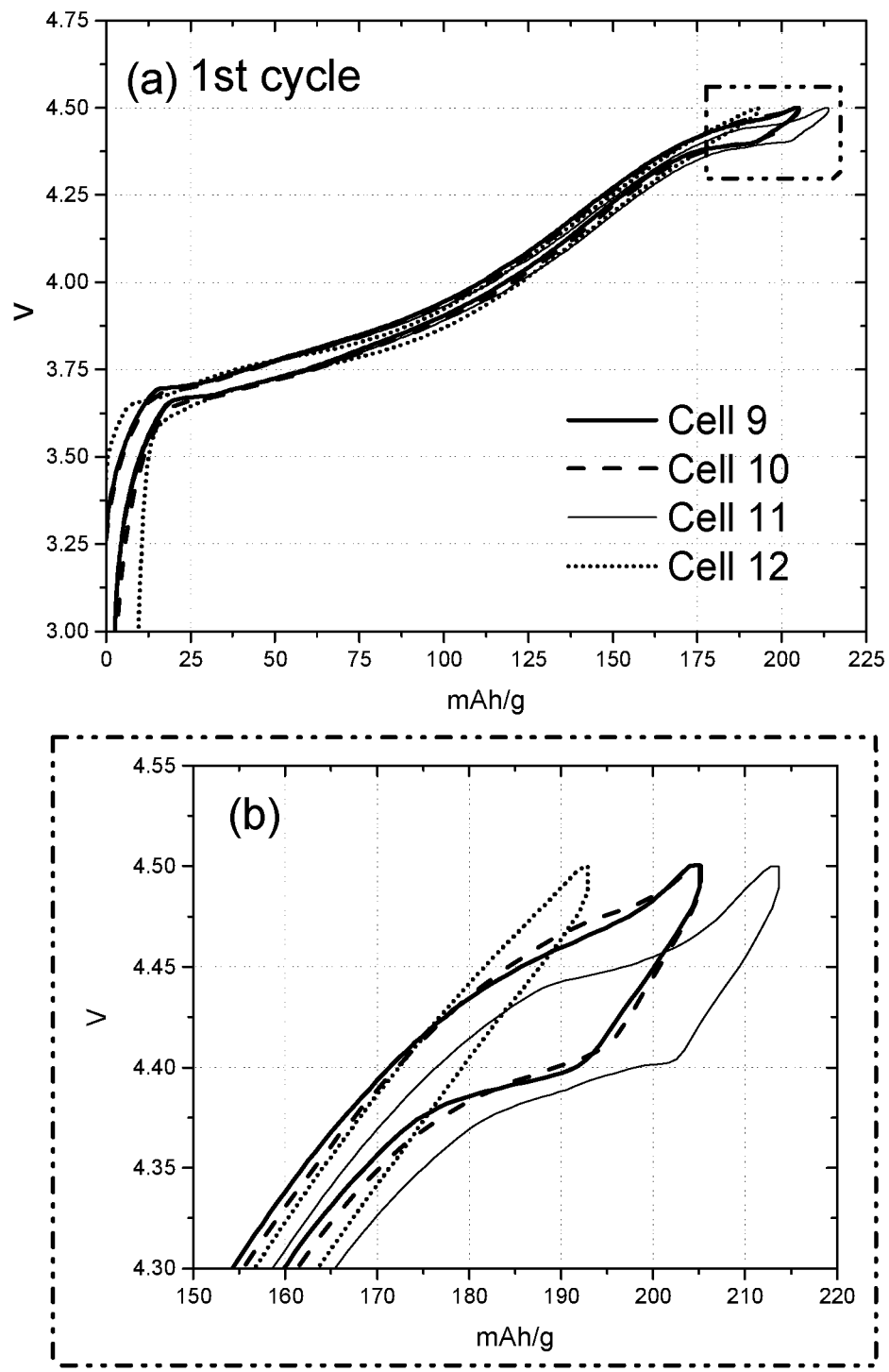
FIG. 11: (a) $1^{st}$ cycle voltage profile of Cell 9 to 11 in the voltage range of 3.0-4.5V; (b) Enlarged graph of FIG. 3(a) in the voltage range of 4.3-4.5V.

FIG. 11 gives the cycling plots of Cell 9 to Cell 12 in the voltage range of 3.0V to 4.5V at 0.1 C-rate. The graph shows the specific cathode capacity. The state-of-charge of the full cell (SOC) is as follows: SOC=100% at voltage 4.5V and the start of charge near 3.0V is SOC=0% for each cell. Graph (a) refers to the 1$^{st}$ cycle voltage profile while graph (b) is an exploded view of the region of 4.3V to 4.5V of graph (a). The thick solid line is the voltage curve of Cell 9, the thin solid line is for Cell 11, the short dot line stands for Cell 12 and the dashed line represents Cell 10. As observed in the "Discussion of Example 1, Example 2 and Counter Example 1", showing the results of a coin cell test, the H1-3 transition appears in the cycling plots of full cells for Cell 9 to 11 with voltage plateaus around 4.45V during discharge, and exists in the curve of Cell 12 with a quite short voltage plateau around 4.4V during discharge. In the 1$^{st}$ cycle, the length of the voltage plateau during discharge is estimated by the difference in capacity between the points at 4.35V and 4.42V of the voltage curve in FIG. 11(b). The results are summarized in Table 9. Cell 11, containing cathode material of CEx1 has a capacity difference of nearly 30 mAh/g between 4.35V and 4.42V, while Cell 9 and Cell 10, which contains Ex1 and Ex2, respectively, have lower values around 26 mAh/g. Cell 12, which contains commercial LCO product has a small value of around 11.9 mAh/g. The small H1-3 transition plateau in Cell 12 may attribute to its relatively low charge and discharge capacity in the first cycle, expressed by CQ1 and DQ1 as listed in Table 9, which is not a promising property for the use of LCO-based material at high voltage.

Figure 12:
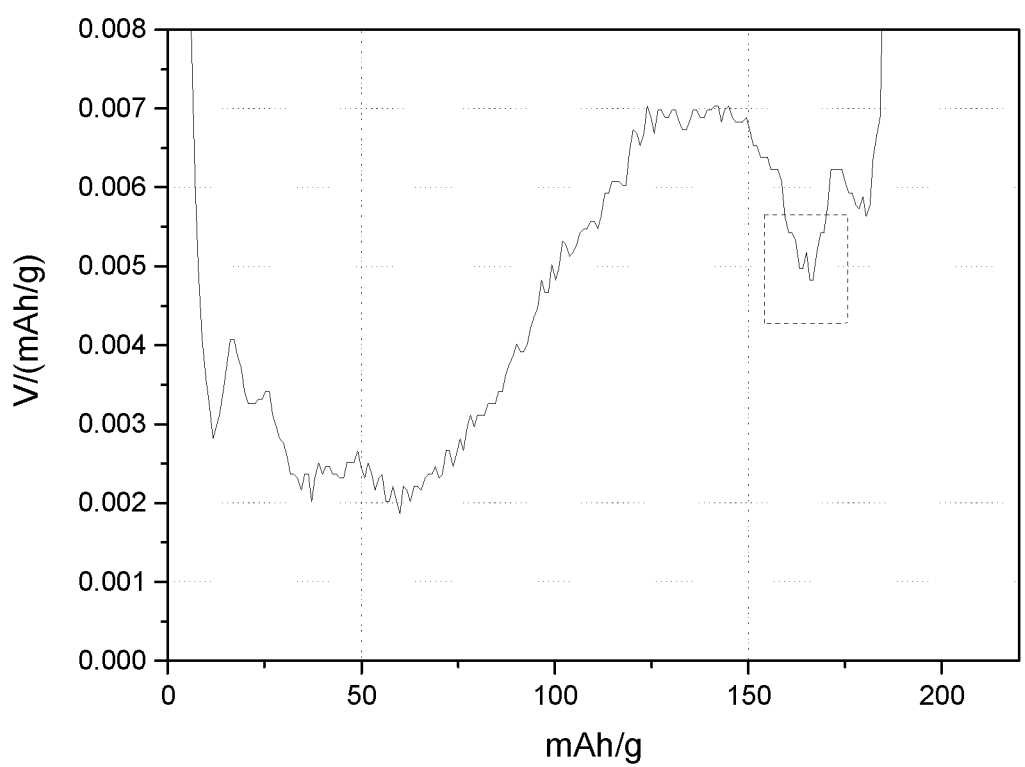
FIG. 12: differential curve dV/dQ of $1^{st}$ cycle voltage profile of commercial $LiCoO_2$

FIG. 12 shows the differential curve of the 1$^{st}$ cycle voltage profile of Cell 12. It delivers the information of dV/dQ as a function of discharge capacity. In the plot, there is a broad peak around 150 mAh/g, which corresponds to the anode behavior during discharge. On the right side of this peak, there is a sudden drop at around 175 mAh/g, which expresses the existence of the voltage plateau of Cell 12 in FIG. 11, even though the voltage plateau is very sloppy, this confirms the existence of a H1-3 transition during discharge in Cell 12.

Figure 13:
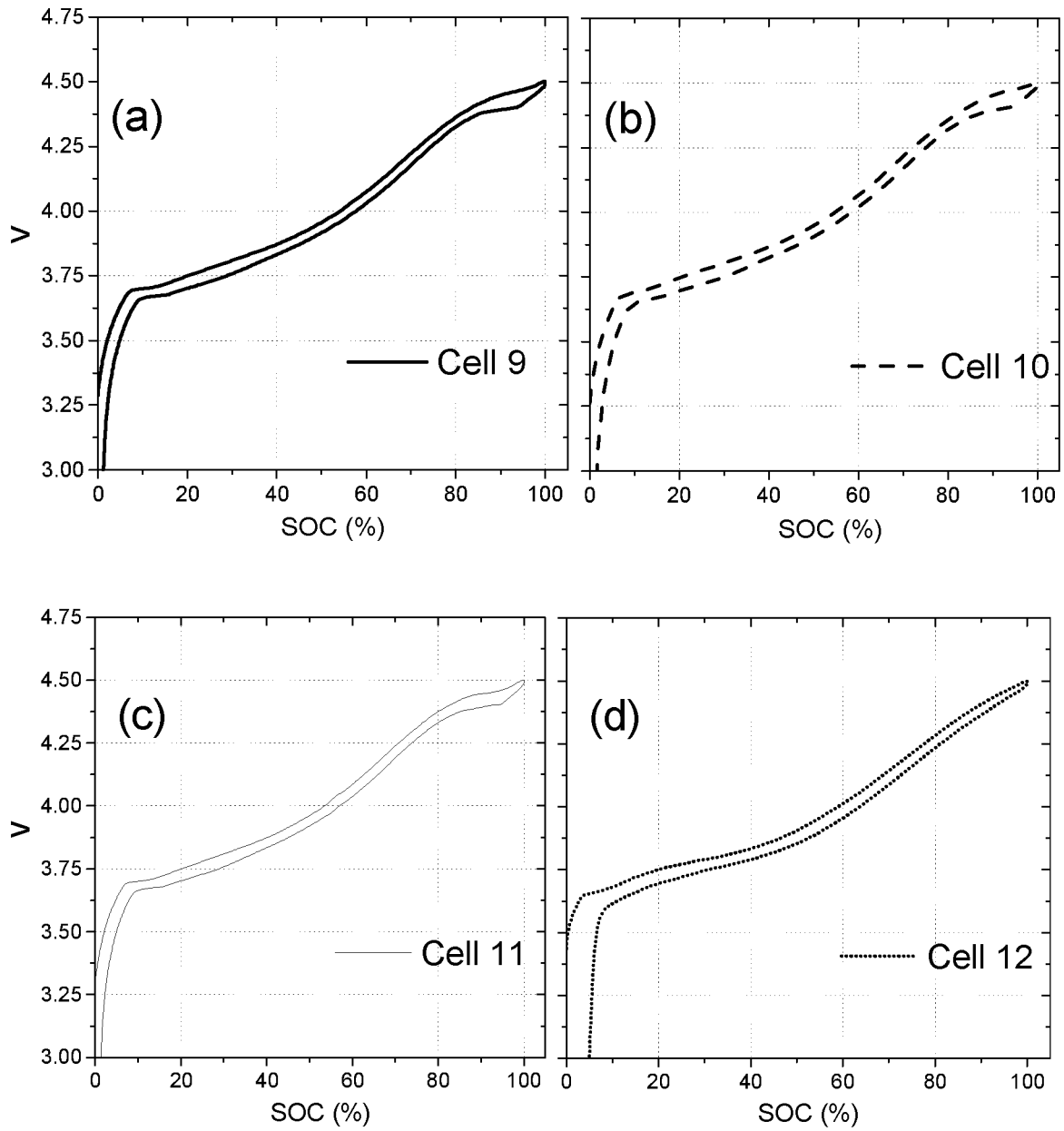
FIG. 13: $1^{st}$ cycle voltage profile as a function of state-of-charge of the full cell (SOC), graph (a) to (d) corresponding to Cell 9 to Cell 12.

FIG. 13 presents the 1$^{st}$ cycle voltage profile as a function of state-of-charge of the full cell (SOC), where graphs (a) to (d) correspond to Cells 9 to 12, respectively. As explained before, the 100% of SOC is defined at the data point of 4.5V. The voltage plateau of the H1-3 transition appears in the voltage range of around 4.35V to 4.42V. The SOC's of each full cell at these voltages are estimated and summarized in Table 10. As discussed before and confirmed here, Ex1 and Ex2 are more preferred as LCO-based cathode materials for high voltage applications, due to their promising cycling stability at high voltage, which is inherently related to the optimized length of the H1-3 transition voltage plateau. The optimized length of the H1-3 transition voltage plateau can be described by the full cell capacity difference of SOC 1 at V=4.35 and SOC 2 at V=4.42 during a discharge at C/10 rate at 45° C., from 4.5V-corresponding to 100%-to 3V, and differs by at least 7% and less than 14%.

In the full cell configuration, graphite is preferred as anode material in this invention, since this material provides a stable voltage near 100% SOC, close to where the H1-3 transition is located. Other anode materials may have variable values at such state-of-charge. So graphite can guarantee a correct estimation of the length of the H1-3 transition plateau in a full cell.

TABLE 9

Summary of full cell data

| Cell ID | CQ1 (mAh) | DQ1 (mAh) | Active material of cathode (g) | Q at 4.35 V (mAh/g) | Q at 4.42 V (mAh/g) | ΔQ (mAh/g) |
|---|---|---|---|---|---|---|
| Cell 9 | 246.02 | 242.86 | 1.20 | 169.56 | 196.12 | 26.56 |
| Cell 10 | 246.26 | 242.40 | 1.21 | 169.91 | 195.57 | 25.66 |
| Cell 11 | 250.10 | 246.46 | 1.17 | 175.18 | 205.08 | 29.91 |
| Cell 12 | 210.29 | 199.86 | 1.09 | 158.31 | 168.46 | 10.14 |

TABLE 10

Summary SOC data of full cells

| Cell ID | SOC at 4.35 V (%) | SOC at 4.42 V (%) | ΔSOC (%) |
|---|---|---|---|
| Cell 9 | 82.20 | 95.55 | 13.35 |
| Cell 10 | 82.94 | 95.94 | 13.00 |
| Cell 11 | 81.60 | 96.00 | 14.40 |
| Cell 12 | 88.58 | 94.77 | 6.19 |

The invention claimed is:

1. A lithium secondary cell having an operating voltage ≥4.35V, comprising
    a cathode comprising a powderous, doped LiCoO$_2$ active material comprising a core and a surface layer, wherein the active material is doped by at least 0.5 mole % of one or more of Mn, Mg and Ti, and wherein
        when the active material is doped by Mg, the Mg:Co ratio in the surface layer versus the Mg:Co ratio in the core is >2, or
        when the active material is doped by Mn, the Mn:Co ratio in the surface layer versus the Mn:Co ratio in the core is >2, or when the active material is doped by Ti, the Ti:Co ratio in the surface layer versus the Ti:Co ratio in the core is >2;
an anode comprising graphite, and
an electrolyte comprising a carbonate-based solvent, a lithium salt and both a succinonitrile (SN) additive and a lithium bis(oxalato) borate (LiBOB) additive,
wherein the core of the active material has a layered crystal structure and consists of the elements Li, a metal M and oxygen, wherein the metal M has the formula $M=Co_{1-a''}M'_{a''}$, with $0 \leq a'' \leq 0.05$, wherein M' is Al or M' is Al and one or more elements selected from the group consisting of Mg, Ti, Ga and B; and the surface layer comprises Li, Co, and inorganic N-based oxides or lithiated oxides, wherein N is one or more metals of the group consisting of Al, Mg, Ti, Ni, Mn, Fe, Cu, Ca, Ba, Y, Sn, Sb, Na, Zn, Zr and Si; and wherein in the active material the molar ratio Al:Co>0.004, and both the Mg and Al contents of the core are different from the Mg and Al contents of the surface layer.

2. The lithium secondary cell of claim 1, wherein during the discharge at 45° C. from a state of charge (SOC) of 100% at 4.5V to a SOC of 0% at 3V at a C/10 rate the difference of the SOC at 4.42V and 4.35V is at least 7% but less than 14%.

3. The lithium secondary cell of claim 1, wherein the electrolyte comprises 0.5-3 wt % succinonitrile.

4. The lithium secondary cell of claim 1, wherein the carbonate-based solvent comprises one or more of ethylene carbonate (EC), vinylene carbonate (VC), fluoroethylene carbonate (FEC) or diethyl carbonate (DEC), and the lithium salt consists of $LiPF_6$.

5. The lithium secondary cell of claim 1, wherein the surface layer of the active material comprises a plurality of islands densely sintered to the core, the islands comprising Ni and at least 5 mole % of Mn.

6. The lithium secondary cell of claim 5, wherein the Mn concentration in the islands is at least 4 mole % higher than the Mn concentration in the core, and wherein the Ni concentration in the islands is at least 2 mole % higher than the Ni concentration in the core.

7. The lithium secondary cell of claim 1, wherein M' is Al or M' is Al and one or both of Ga and B; and the surface layer consists of Li, Co, and inorganic N-based oxides or lithiated oxides, wherein N is Al, Ti and Mg, or N is Al, Ti, Mg and one or more metals selected from the group consisting of Fe, Cu, Ca, Ba, Y, Sn, Sb, Na, Zn, Zr and Si.

8. The lithium secondary cell of claim 7, wherein the molar ratio Li:(Co+Al) is more than 0.98 and less than 1.01.

9. The lithium secondary cell of claim 7, wherein the active material has an electrical conductivity less than $10^{-5}$ S/cm measured under a pressure of 63.7 MPa at 25° C.

10. The lithium secondary cell of claim 1, wherein the active material has the general composition $Li_xCo_{1-a-b}M^1_aM^2_bO_{2-d}$ with $0.97<x$, $0.005 \leq a<0.10$, $0.001 \leq b \leq 0.02$, and $-0.1 \leq d \leq 0.1$, wherein $M^1$ is one or both of Ni and Mn, $M^2$ is one or more metals selected from the group consisting of Al, Mg, Ca, Ti, and Zr, wherein particles of the active material comprise a core P2 and a shell P1, wherein P1 consists of a plurality of islands densely sintered to the core P2, wherein the weight ratio P1/P2 is <0.5 and P1+P2=1, wherein the molar content of $M^1$ in P2 is less than the molar content of $M^1$ in P1, and the molar content of ($M^2$+Co) in P2 is more than the molar content of ($M^2$+Co) in P1.

11. The lithium secondary cell of claim 1, wherein the core of the active material has a layered crystal structure and consists of the elements Li, a metal M and oxygen, wherein the metal M has the formula $M=Co_{1-a''}M'_{a''}$, with $0 \leq a'' \leq 0.05$, wherein M' is Al or M' is Al and one or more elements selected from the group consisting of Mg, Ti, Ga and B; and the surface layer comprises Li, Co, and inorganic N-based oxides or lithiated oxides, wherein N is one or more metals of the group consisting of Al, Mg, Ti, Ni, Mn, Fe, Cu, Ca, Ba, Y, Sn, Sb, Na, Zn, Zr and Si; and wherein in the active material the molar ratio Al:Co>0.004.

12. The lithium secondary cell of claim 1, wherein the electrolyte comprises 0.5-3 wt % succinonitrile and 0.5-5 wt % lithium bis(oxalato)borate.

13. A lithium secondary cell having an operating voltage ≥4.35V, comprising
a cathode comprising a powderous, doped $LiCoO_2$ active material comprising a core and a surface layer, wherein the active material is doped by at least 0.5 mole % of one or more of Mn, Mg and Ti, and wherein
when the active material is doped by Mg, the Mg:Co ratio in the surface layer versus the Mg:Co ratio in the core is >2, or
when the active material is doped by Mn, the Mn:Co ratio in the surface layer versus the Mn:Co ratio in the core is >2, or
when the active material is doped by Ti, the Ti:Co ratio in the surface layer versus the Ti:Co ratio in the core is >2;
an anode comprising graphite, and
an electrolyte comprising a carbonate-based solvent, a lithium salt and both a succinonitrile (SN) and a lithium bis(oxalato) borate (LiBOB) additive, wherein the active material has the general composition $Li_xCo_{1-a-b}M^1_aM^2_bO_{2-d}$ with $0.97<x<1.01$, $0.005 \leq a<0.10$, $0.001 \leq b \leq 0.02$, and $-0.1 \leq d \leq 0.1$, wherein $M^1$ is one or both of Ni and Mn, $M^2$ is one or more metals selected from the group consisting of Al, Mg, Ca, Ti, and Zr, wherein particles of the active material comprise a core P2 and a shell P1, wherein P1 consists of a plurality of islands densely sintered to the core P2, wherein the weight ratio P1/P2 is <0.5 and P1+P2=1, wherein the molar content of $M^1$ in P2 is less than the molar content of $M^1$ in P1, and the molar content of ($M^2$+Co) in P2 is more than the molar content of ($M^2$+Co) in P1.

14. A lithium secondary cell having an operating voltage ≥4.35V, comprising
a cathode comprising a powderous, doped $LiCoO_2$ active material comprising a core and a surface layer, wherein the active material is doped by at least 0.5 mole % of one or more of Mn, Mg and Ti, and wherein
when the active material is doped by Mg, the Mg:Co ratio in the surface layer versus the Mg:Co ratio in the core is >2, or
when the active material is doped by Mn, the Mn:Co ratio in the surface layer versus the Mn:Co ratio in the core is >2, or
when the active material is doped by Ti, the Ti:Co ratio in the surface layer versus the Ti:Co ratio in the core is >2;
an anode comprising graphite, and
an electrolyte comprising a carbonate-based solvent, a lithium salt and both a succinonitrile (SN) and a lithium bis(oxalato) borate (LiBOB) additive, wherein the active material has the general composition $Li_{x'}Co_{1-a'-b'}M^3_aM^4_bO_{2-d'}$ with $0.97<x'<1.01$, $0.005 \leq a'<0.10$, $0.001 \leq b' \leq 0.02$, and $-0.1 \leq d' \leq 0.1$, wherein $M^3$ is one or both of Ni and Mn, $M^4$ is Al, or Al and one or more metals selected from the group consisting of Mg, Ca, Ti, and Zr, wherein particles of the active material comprise a core P2 and a shell P1, wherein P1 comprises Co and $M^3$, wherein P2 comprises Co and Al, wherein P1 consists of a plurality of islands densely sintered to the core and the weight ratio P1/P2 is <0.5 and P1+P2=1, wherein the molar content of $M^3$ in P2 is less than the molar content of $M^3$ in P1, and the molar content of Al in P2 is more than the molar content of Al in P1.

* * * * *